US010042628B2

United States Patent
OlmstedThompson

(10) Patent No.: US 10,042,628 B2
(45) Date of Patent: Aug. 7, 2018

(54) AUTOMATED UPGRADE SYSTEM FOR A SERVICE-BASED DISTRIBUTED COMPUTER SYSTEM

(71) Applicant: VMware, Inc., Palo Alto, CA (US)

(72) Inventor: Jeremy OlmstedThompson, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 86 days.

(21) Appl. No.: 15/199,801

(22) Filed: Jun. 30, 2016

(65) Prior Publication Data

US 2018/0004503 A1 Jan. 4, 2018

Related U.S. Application Data

(60) Provisional application No. 62/356,459, filed on Jun. 29, 2016.

(51) Int. Cl.
| | |
|---|---|
| *G06F 9/445* | (2018.01) |
| *G06F 8/65* | (2018.01) |
| *H04L 12/24* | (2006.01) |
| *H04L 29/08* | (2006.01) |

(52) U.S. Cl.
CPC ............ *G06F 8/65* (2013.01); *H04L 41/0273* (2013.01); *H04L 67/02* (2013.01); *H04L 67/34* (2013.01)

(58) Field of Classification Search
CPC ................. G06F 8/63; G06F 8/65; G06F 8/61
USPC ........................................ 717/168, 170, 171
See application file for complete search history.

(56) References Cited

U.S. PATENT DOCUMENTS

| | | | | |
|---|---|---|---|---|
| 6,711,557 | B1 * | 3/2004 | Palaniappan | G06F 8/60 706/45 |
| 8,434,077 | B2 * | 4/2013 | Chess | G06F 9/455 717/168 |
| 9,641,348 | B2 * | 5/2017 | Mattsson | H04L 12/1407 |
| 9,753,713 | B2 * | 9/2017 | Mani | G06F 8/65 |
| 2009/0106748 | A1 * | 4/2009 | Chess | G06F 8/65 717/168 |
| 2009/0217255 | A1 * | 8/2009 | Troan | G06F 8/65 717/168 |

(Continued)

*Primary Examiner* — Phillip H Nguyen
(74) *Attorney, Agent, or Firm* — Clayton, McKay & Bailey, PC

(57) ABSTRACT

The current document is directed to an automated upgrade subsystem within a distributed computer system that executes a distributed, service-based application comprising multiple local instances of the a distributed, service-based application, each instance including one or more control programs executing on a physical computer-system component of the distributed computer system. In one implementation, the automated upgrade subsystem provides a user interface that allows a system administrator or other user to launch a distributed-system-wide upgrade of a distributed application with a single input to a single input feature on a displayed user interface. The automated upgrade subsystem carries out a hierarchical, rolling upgrade, automatically generates snapshots for each physical computer system prior to launching local upgrade logic on the physical computer systems, detects upgrade problems and, in certain cases, automatically conducts a distributed-computer-system-wide rollback for problems that cannot be automatically or manually resolved.

18 Claims, 44 Drawing Sheets

(56) References Cited

U.S. PATENT DOCUMENTS

2011/0225574 A1* 9/2011 Khalidi .................. G06F 8/63
717/168
2012/0102481 A1* 4/2012 Mani .................. G06F 11/0757
717/172

* cited by examiner

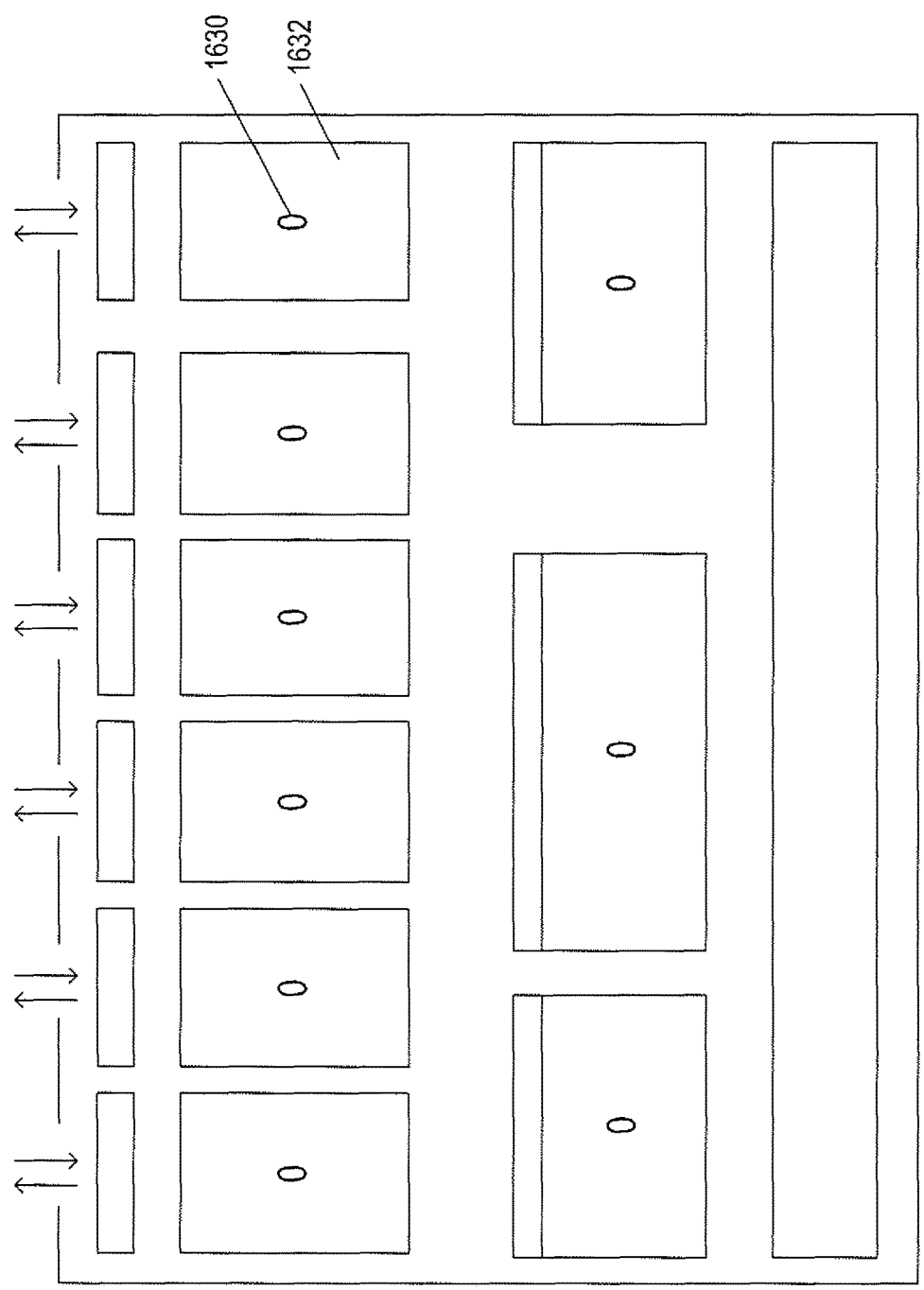

| event | request-specific information | new state | target state | current state range | rollback indication | upgrade-failure indication | handler-specific function |
|---|---|---|---|---|---|---|---|
| initiate upgrade | upgrade package target version | UPGRADE_REQUESTED | UPGRADE_INITIATED | NOT_UPGRADING | false | false | check current version and computational resources to determine whether upgrade can be carried out |
| initiate snapshot | | SNAPSHOT_REQUESTED | UPGRADE_PENDING | UPGRADE_INITIATED | false | true | prepare and persistently store snapshot |
| finish upgrade | | UPGRADING | UPGRADE_COMPLETED | UPGRADE_PENDING | true | false | persistently store indication of upgrade in progress; persistently store target_version executables and data files; restart target version |
| initiate verify | reference to verify API | VERIFY_REQUESTED | VERIFY/ NOT_UPGRADING | UPGRADE_COMPLETED | true | false | call verification API to test new target version |

FIG. 19H

AUTOMATED UPGRADE SYSTEM FOR A SERVICE-BASED DISTRIBUTED COMPUTER SYSTEM

TECHNICAL FIELD

The current document is directed to distributed computer systems, automated administrative and maintenance subsystems for distributed computer systems and, in particular, to an automated upgrade system that upgrades a distributed service-based control program that executes on multiple physical computer systems within a distributed computer system.

BACKGROUND

Computer systems have continuously evolved over the past 60 years. Initial computer systems were room-sized, vacuum-tube-based behemoths with far less computational bandwidth and smaller data-storage capacities than a modern smart phone or even a microprocessor controller embedded in any of various consumer appliances and devices. Initial computer systems ran primitive programs one at a time, without the benefit of operating systems, high-level languages, and networking. Over time, parallel development of hardware, compilers, operating systems, virtualization technologies, and distributed-computing technologies has led to modern distributed computing systems, including cloud-computing facilities, that feature hundreds, thousands, tens of thousands, or more high-end servers, each including multiple multi-core processors, that can access remote computer systems and that can be accessed by remote client computers throughout the world through sophisticated electronic communications. Due to the complexity of modern distributed computing systems, it has become an exceedingly time-consuming and difficult task for system administrators and others who maintain distributed computer systems to upgrade distributed applications periodically, when new versions of the distributed applications become available. In a distributed computer system comprising thousands of physical servers, for example, a system administrator may have to carry out an essentially manual upgrade for each individual physical server. In the case that one of the upgrades fails, the system administrator is often left with an incompletely upgraded distributed application. In such cases, the system administrator may need to back out upgrades on already-upgraded servers or to suspend execution of many instances of the distributed application until upgrade problems can be addressed. Even the bookkeeping requirements for maintaining upgrade and version status for the many physical servers within a large distributed computing system may be at least onerous and often extremely error prone and complex. For all these reasons, designers and developers of distributed applications and distributed computer systems, system administrators, owners, and ultimately users of such systems continue to seek better methods and subsystems for addressing distributed-application upgrade.

SUMMARY

The current document is directed to an automated upgrade subsystem within a distributed computer system that executes a distributed, service-based application comprising multiple local instances of the a distributed, service-based application, each instance including one or more control programs executing on a physical computer-system component of the distributed computer system. In one implementation, the automated upgrade subsystem provides a user interface that allows a system administrator or other user to launch a distributed-system-wide upgrade of a distributed application with a single input to a single input feature on a displayed user interface. The automated upgrade subsystem carries out a hierarchical, rolling upgrade, automatically generates snapshots for each physical computer system prior to launching local upgrade logic on the physical computer systems, detects upgrade problems and, in certain cases, automatically conducts a distributed-computer-system-wide rollback for problems that cannot be automatically or manually resolved.

BRIEF DESCRIPTION OF THE DRAWINGS

FIGS. 16A-K illustrate, using high-level block-diagram-based illustrations, certain features of the automated upgrade subsystem to which the current document is directed.

FIGS. 19A-H illustrate, using control-flow diagrams and a table, an implementation for the upgrade process carried out by each upgrade service for each component of a distributed service-based application according to the automated update subsystem and methods to which the current document is directed.

DETAILED DESCRIPTION OF EMBODIMENTS

It should be noted, at the onset, that the current document is directed to implemented functionalities, and systems containing implemented functionality, that are real, tangible, physical subcomponents of physical devices and systems. One frequently encounters statements made by those unfamiliar with modern science and technology with regard to the "abstract" nature of "software," whatever the non-technically and non-scientifically educated individuals mean by these terms. Those familiar with science and technology well understand that much of the control logic incorporated within modern devices, machines, and systems is implemented as large sets of processor instructions that are physically stored in memories, mass-storage devices, and removable storage media and that must necessarily be so physically embodied in order to be accessed by processors and other computer machinery for execution. Physically embodied processor instructions are no less physical, tangible, and real than power supplies, processors, component housings, electronic memories, internal and external communications hardware, and other such components of modern devices, machines, and systems.

The current document is directed to an automated upgrade subsystem and methods within distributed computing systems that carries out a hierarchical, rolling upgrade of a distributed, service-based application, instances of which run on multiple physical computer systems. In a first subsection, below, an overview of distributed computing systems is provided, with reference to FIGS. 1-10. In a second subsection, the RESTful communications protocol is discussed with reference to FIGS. 12-13C. In a third subsection, the automated upgrade subsystem and methods to which the current document is directed are discussed, with reference to FIGS. 14A-20B.

Overview of Distributed Computing Systems

Figure 1:
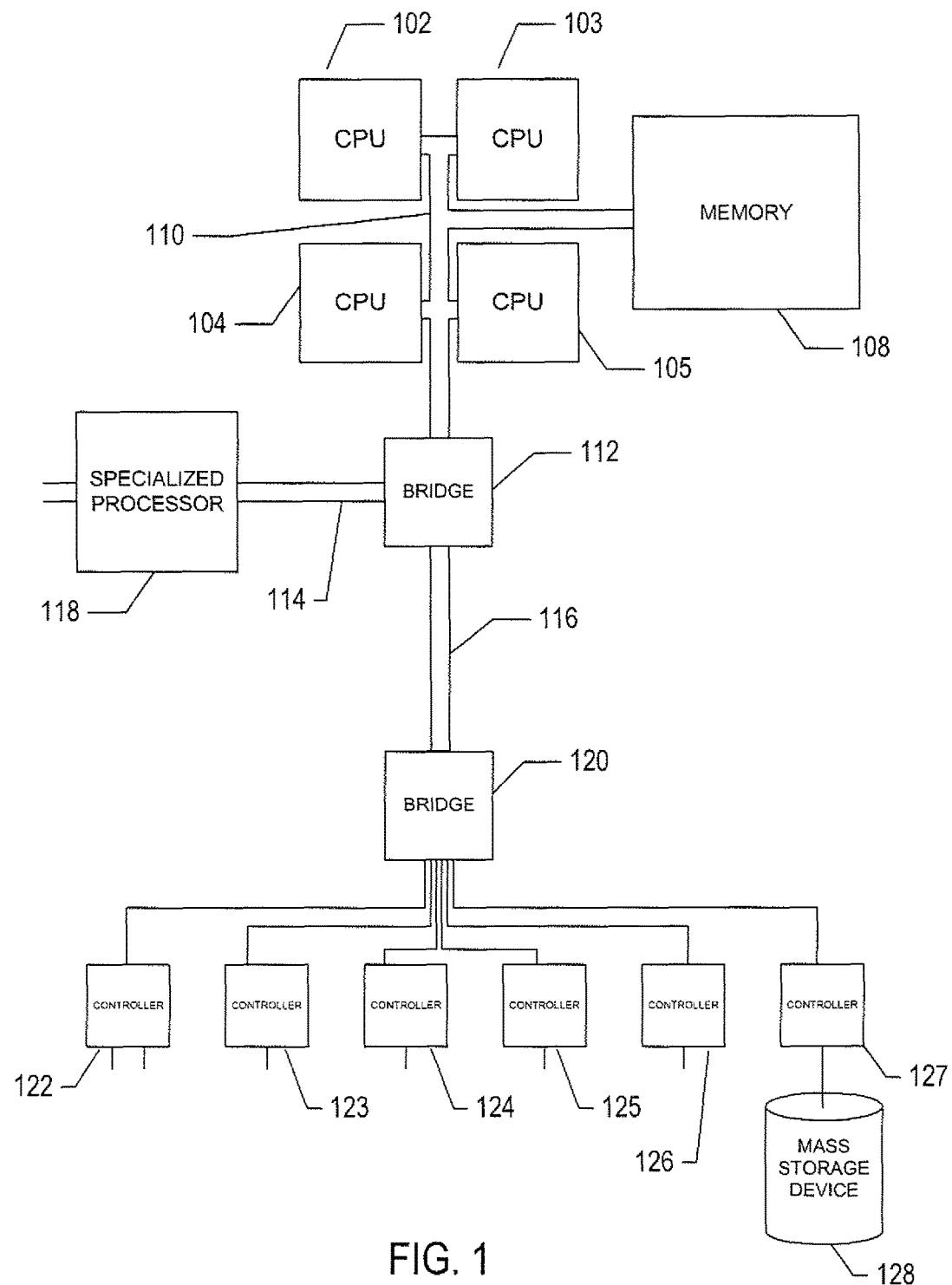
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
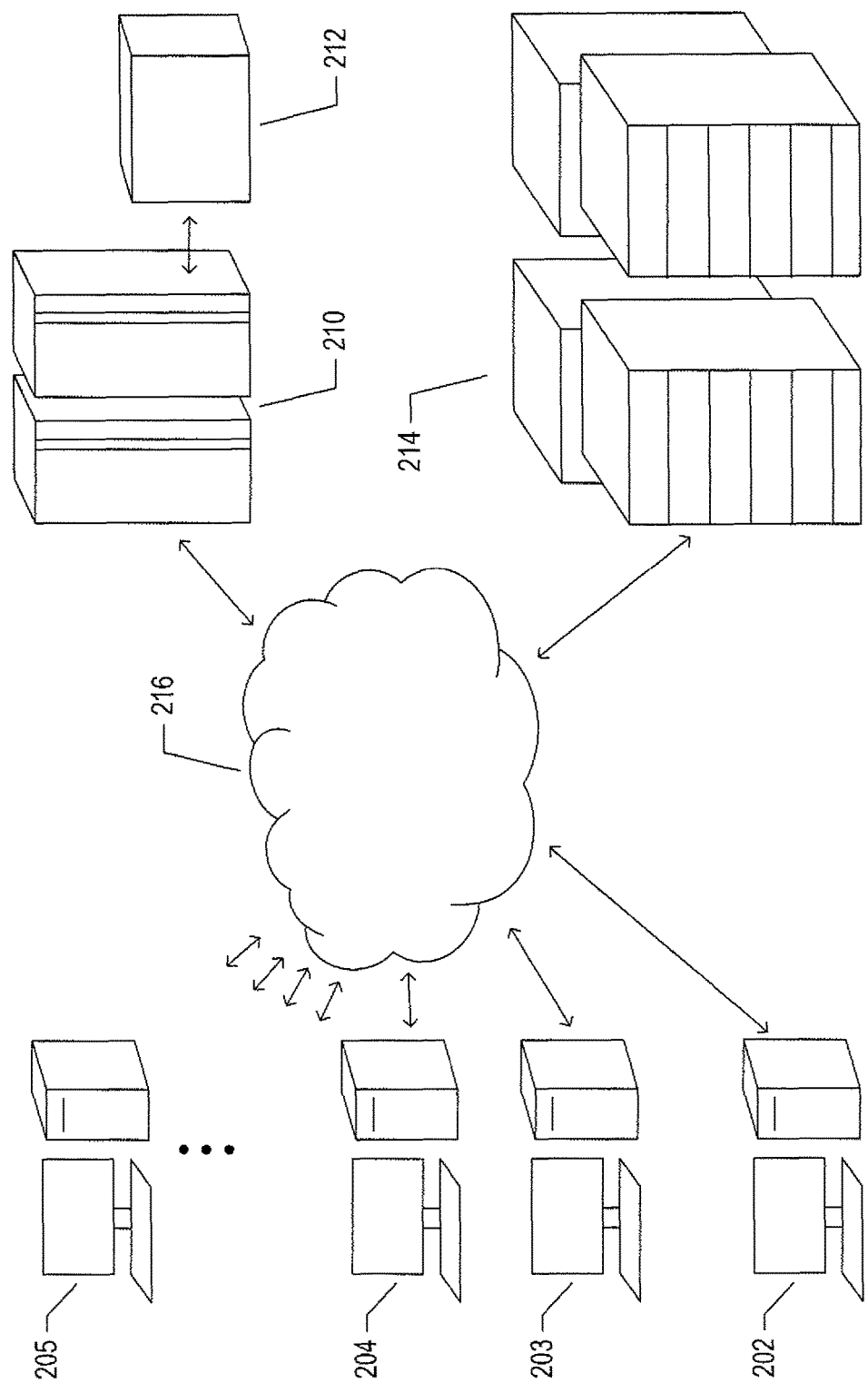
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
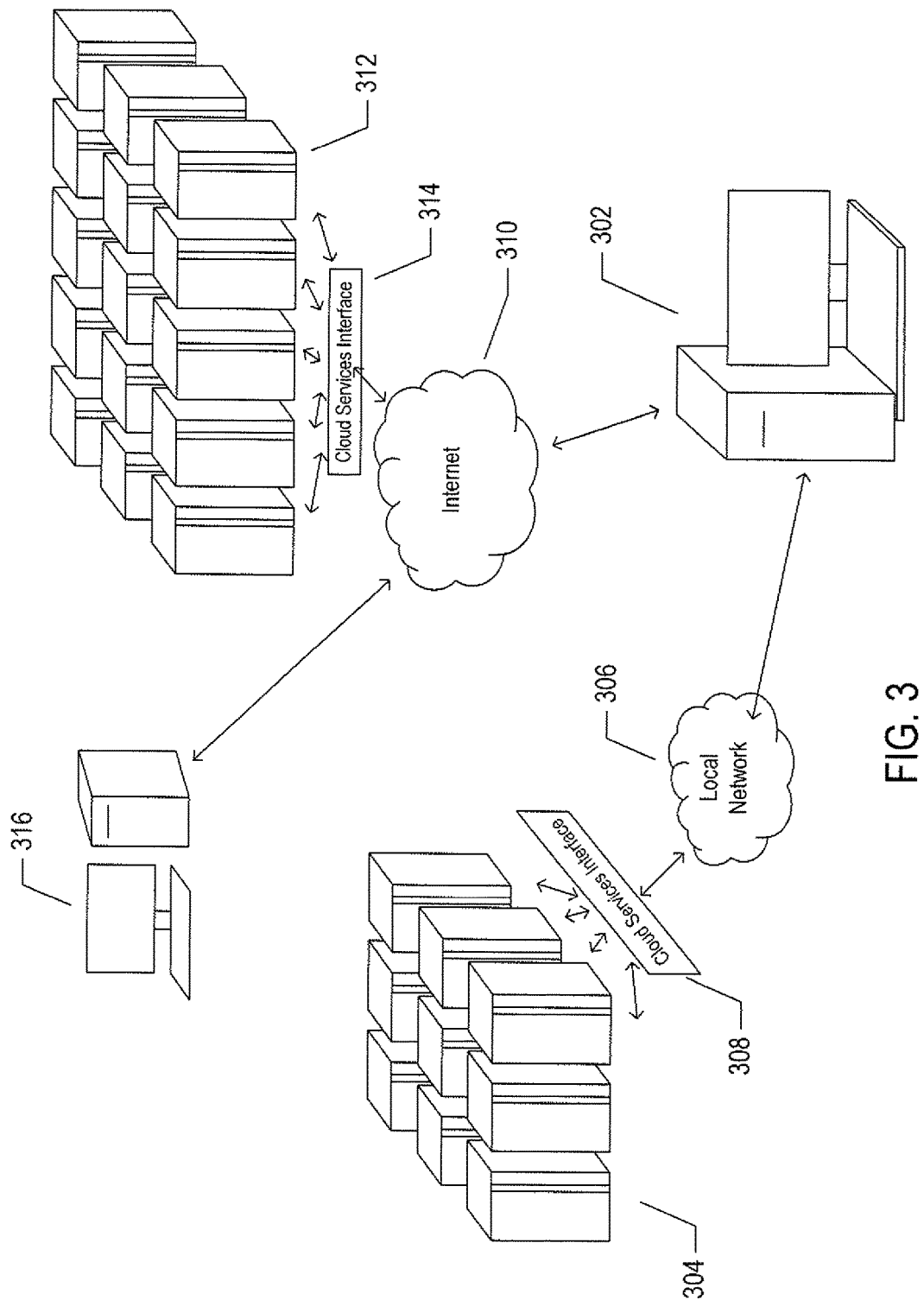
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
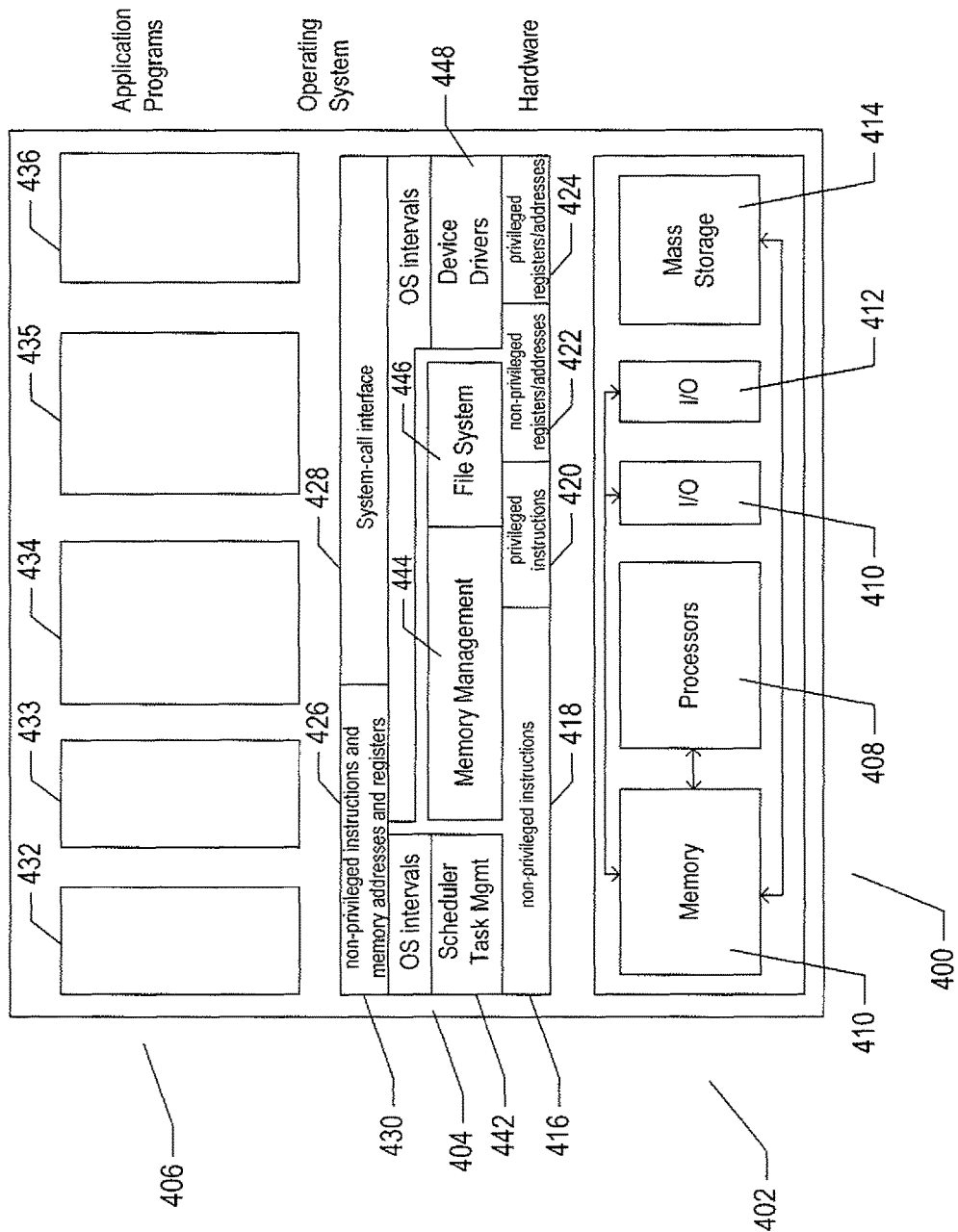
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
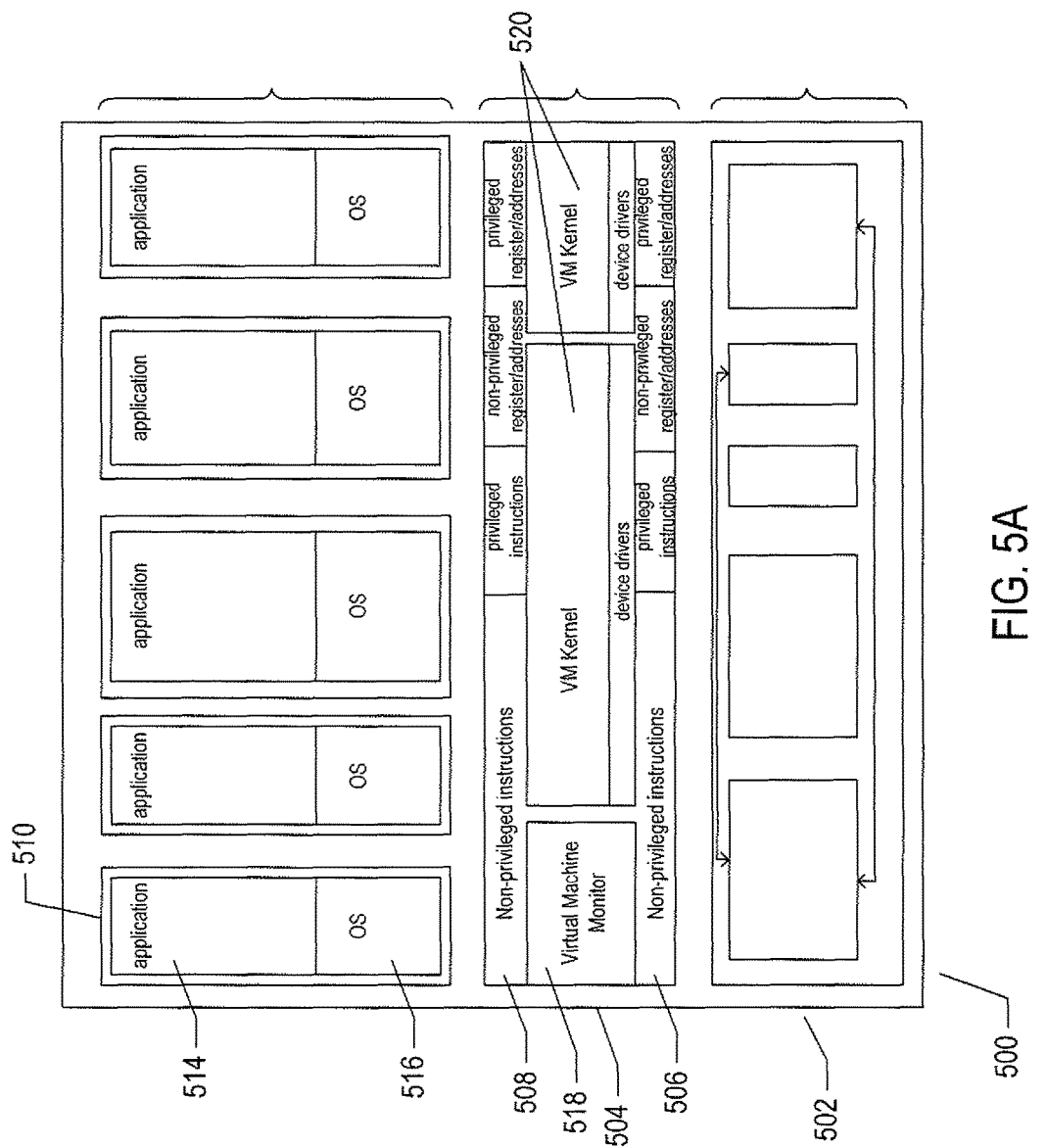
FIGS. 5A-D illustrate several types of virtual machine and virtual-machine execution environments.
Figure 5B:
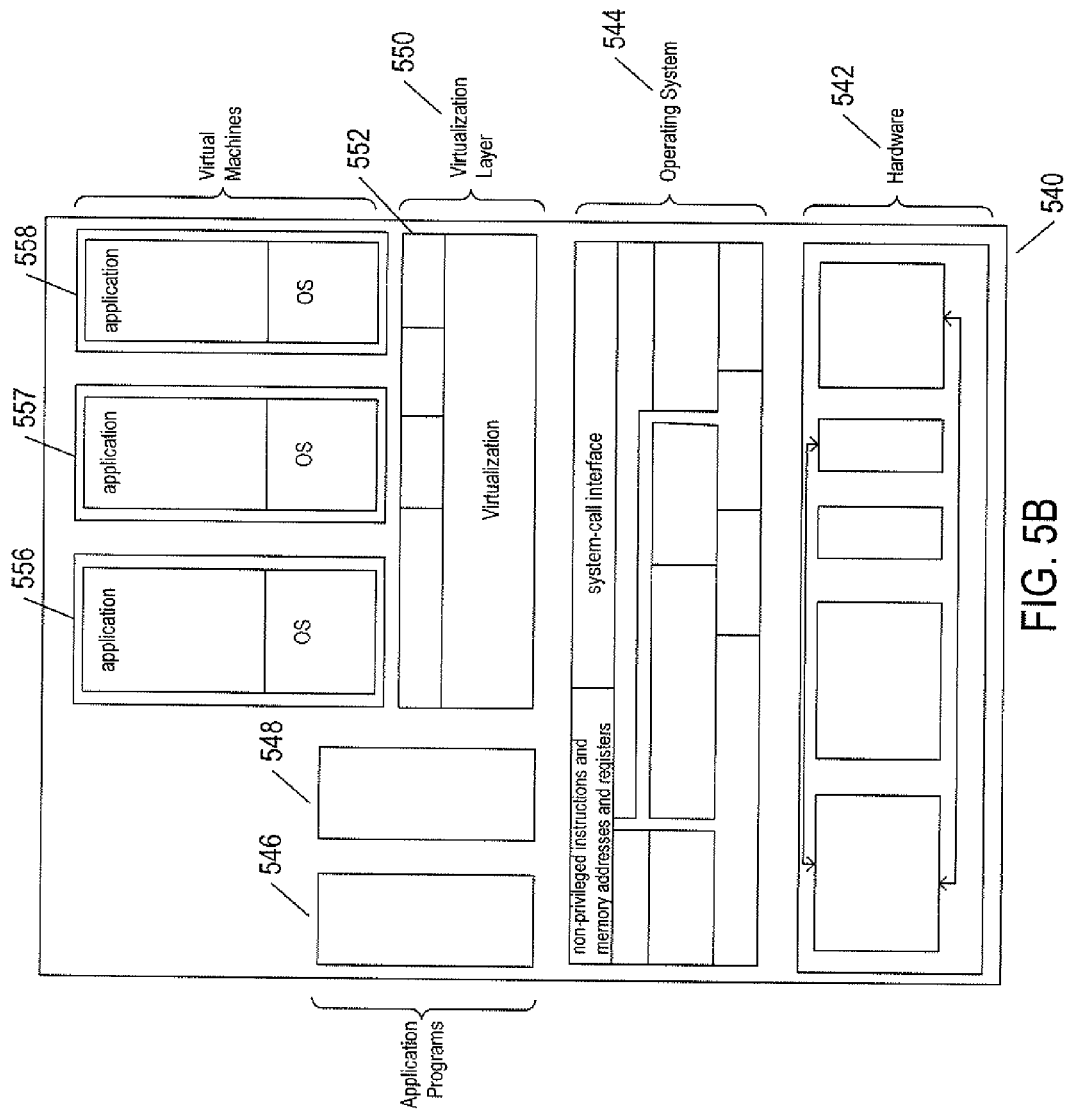

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
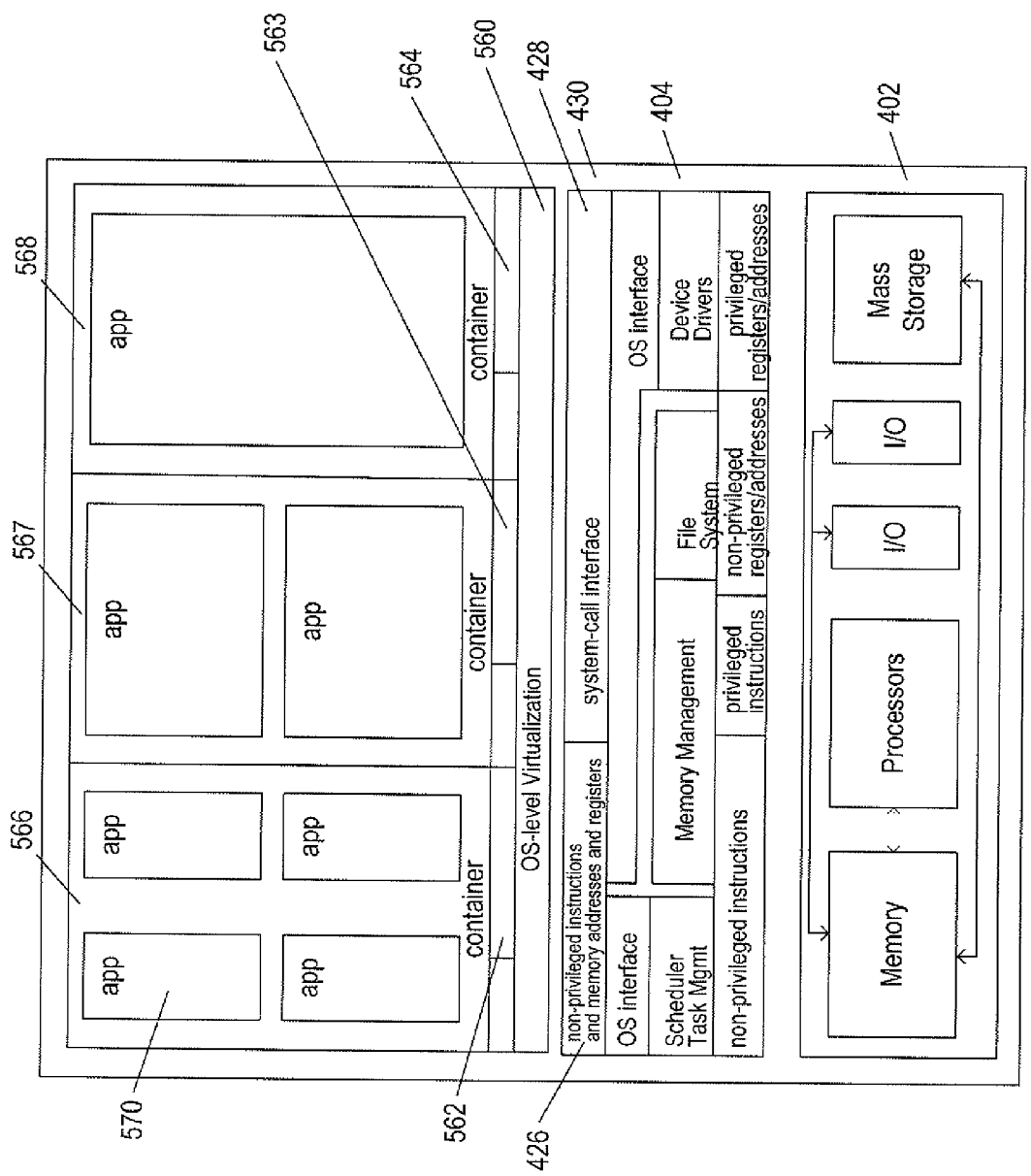

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
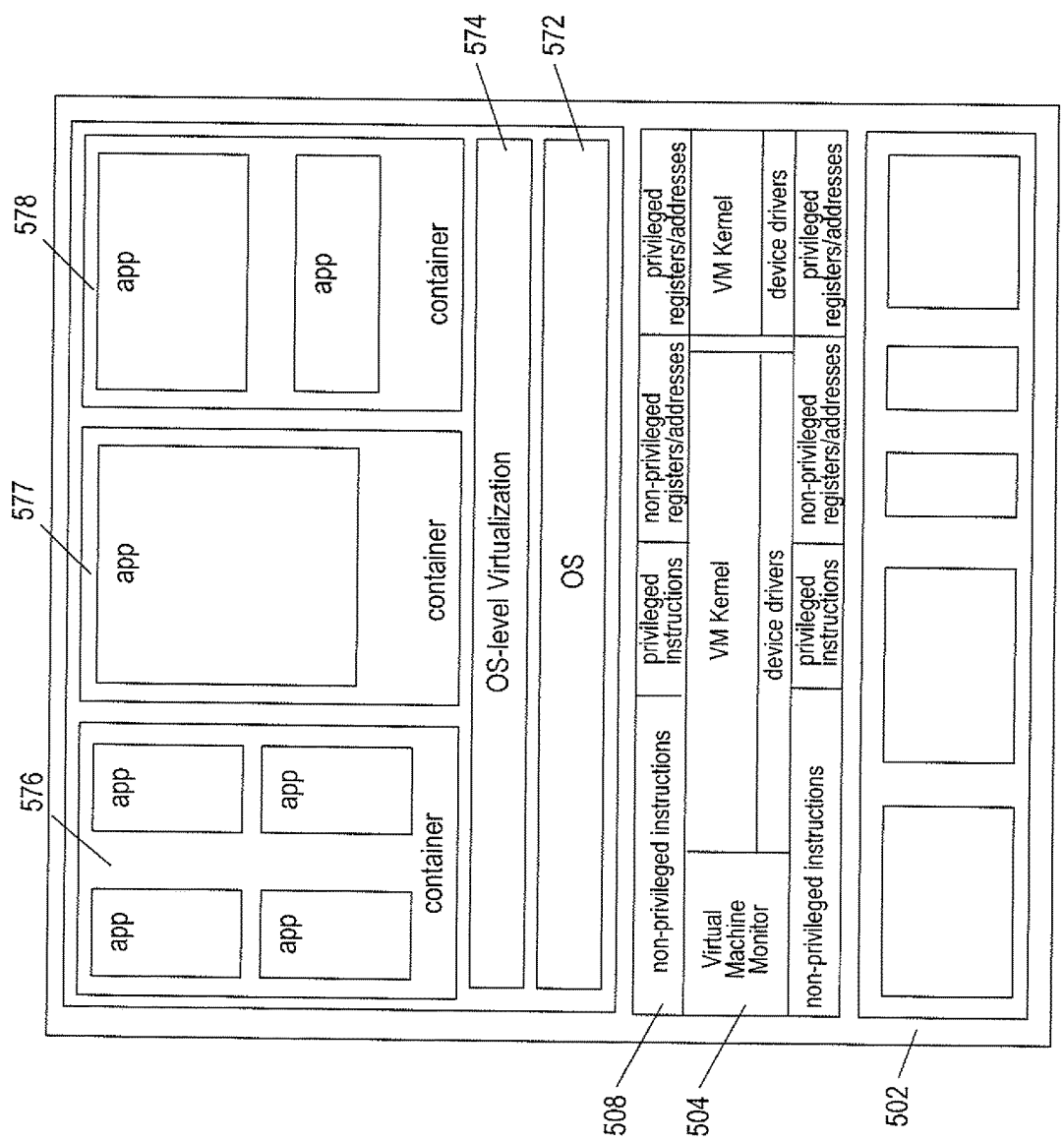

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

In FIGS. 5A-D, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
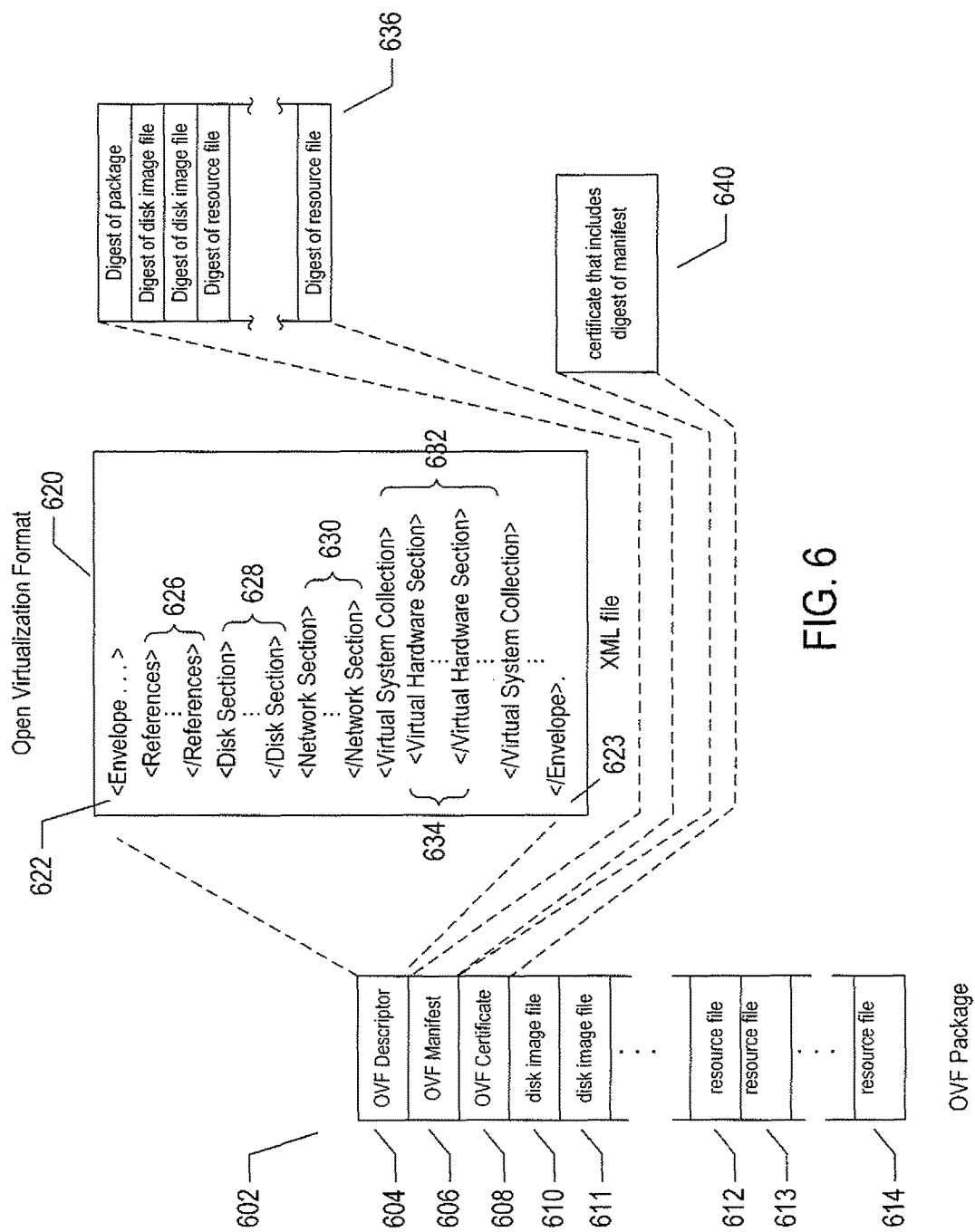
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
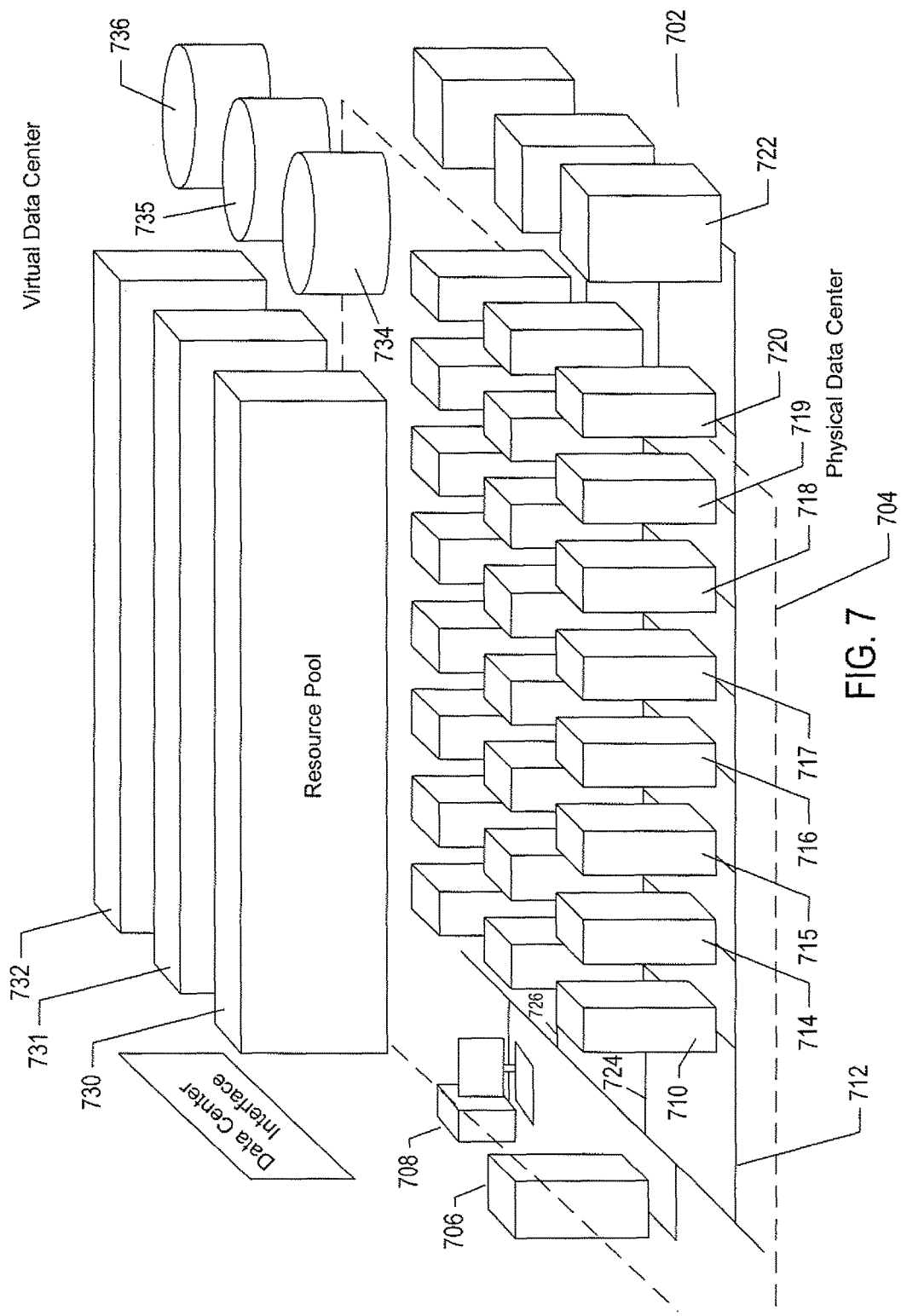
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
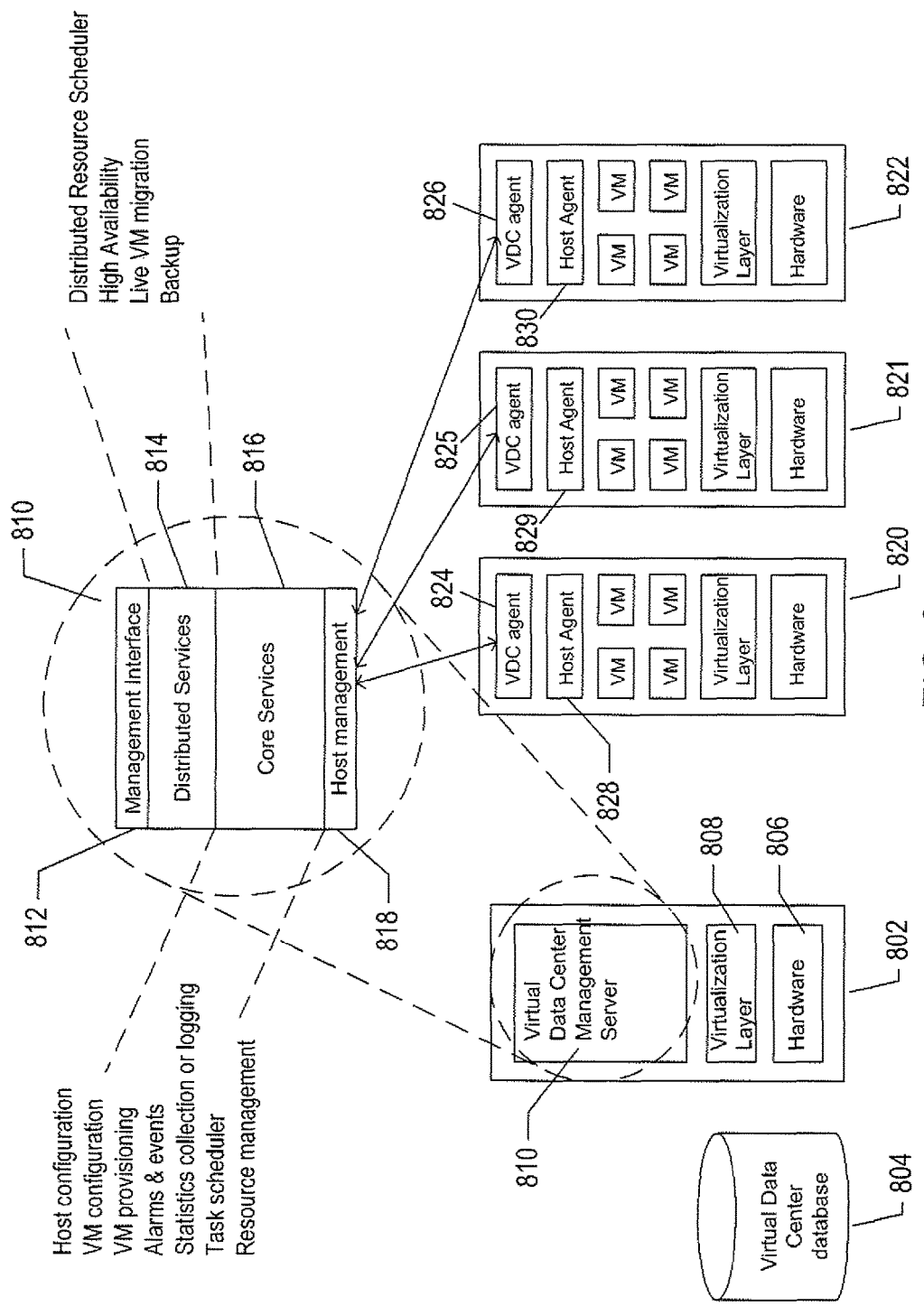
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center agents and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtualdata-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
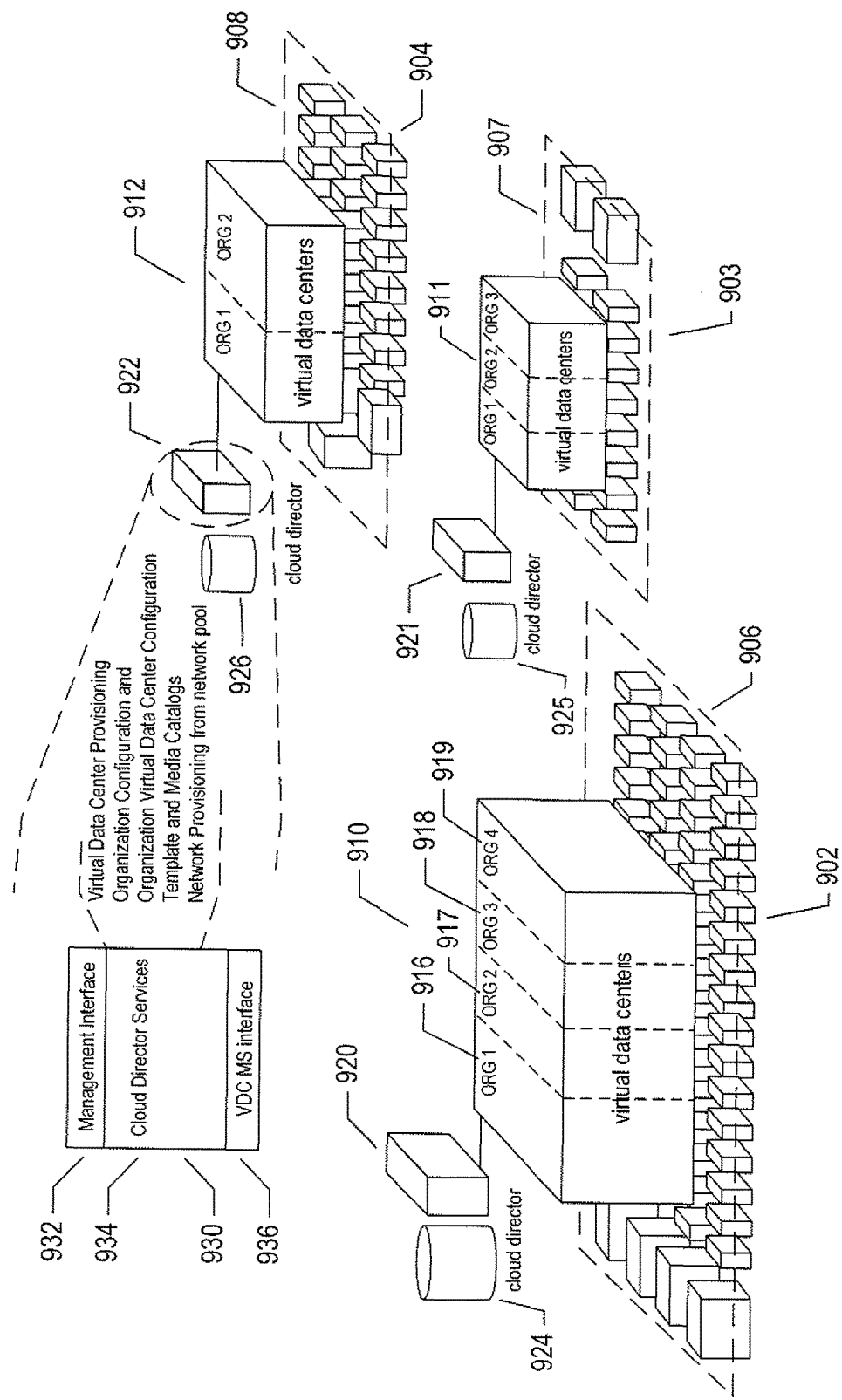
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
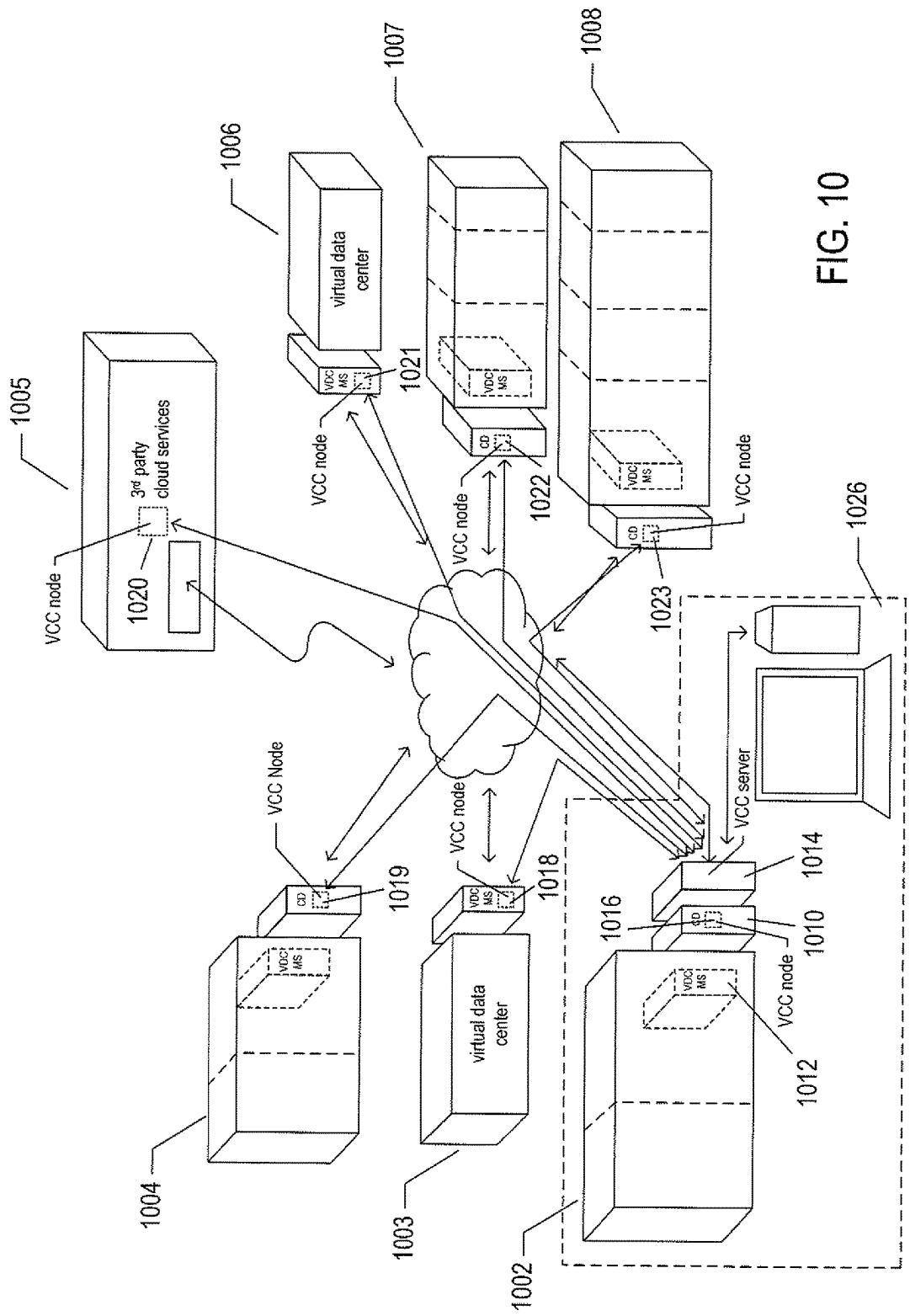
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

The REST Protocol and RESTful Applications

Figure 11:
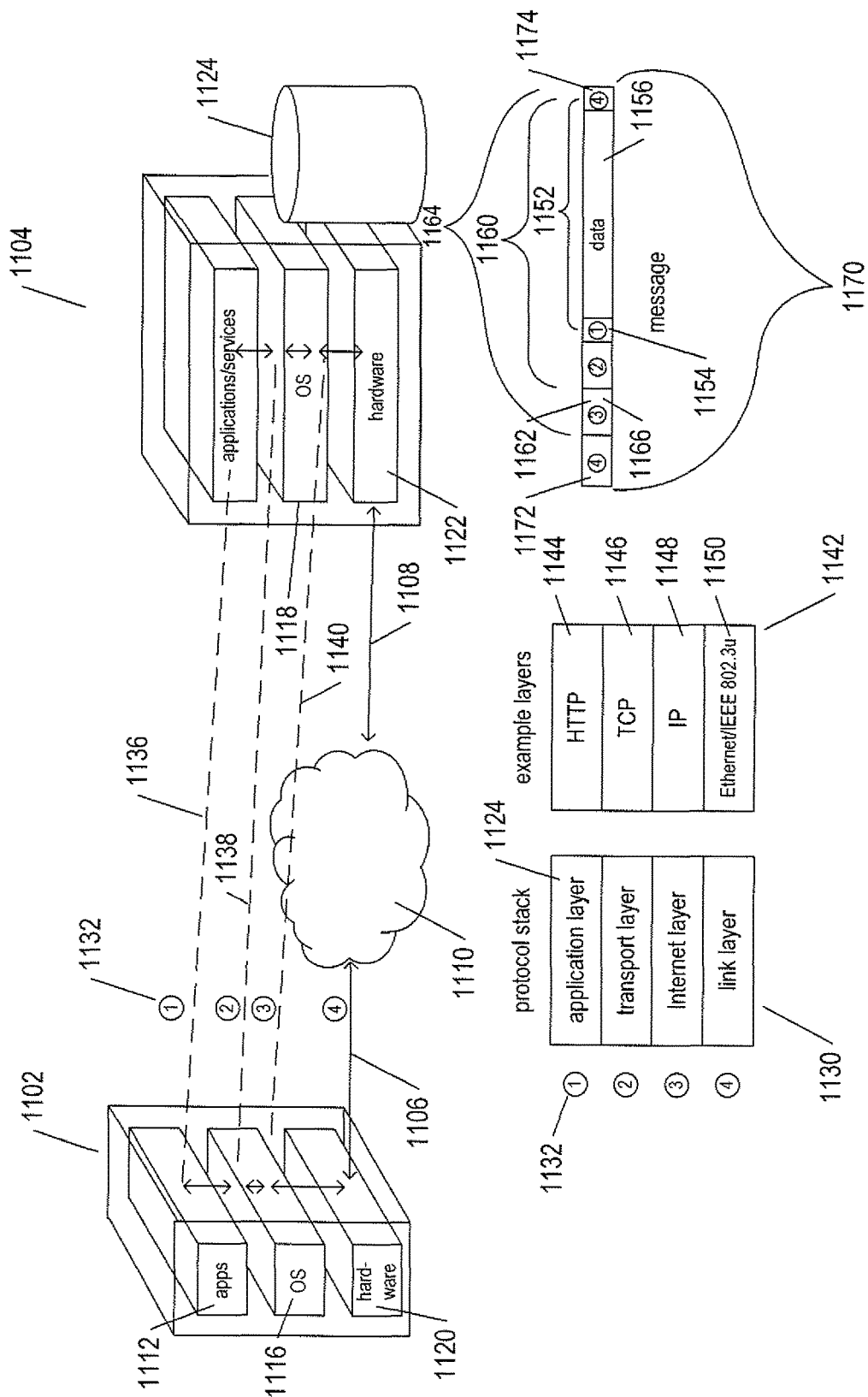
FIG. 11 shows a representation of a common protocol stack.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." FIG. 11 shows a representation of a common protocol stack. In FIG. 11, a representation of a common protocol stack 1130 is shown below the interconnected server and client computers 1104 and 1102. The layers are associated with layer numbers, such as layer number "1" 1132 associated with the application layer 1134. These same layer numbers are used in the depiction of the interconnection of the client computer 1102 with the server computer 1104, such as layer number "1" 1132 associated with a horizontal dashed line 1136 that represents interconnection of the application layer 1112 of the client computer with the applications/services layer 1114 of the server computer through an application-layer protocol. A dashed line 1136 represents interconnection via the application-layer protocol in FIG. 11, because this interconnection is logical, rather than physical. Dashed-line 1138 represents the logical interconnection of the operating-system layers of the client and server computers via a transport layer. Dashed line 1140 represents the logical interconnection of the operating systems of the two computer systems via an Internet-layer protocol. Finally, links 1106 and 1108 and cloud 1110 together represent the physical communications media and components that physically transfer data from the client computer to the server computer and from the server computer to the client computer. These physical communications components and media transfer data according to a link-layer protocol. In FIG. 11, a second table 1142 aligned with the table 1130 that illustrates the protocol stack includes example protocols that may be used for each of the different protocol layers. The hypertext transfer protocol ("HTTP") may be used as the application-layer protocol 1144, the transmission control protocol ("TCP") 1146 may be used as the transport-layer protocol, the Internet protocol 1148 ("IP") may be used as the Internet-layer protocol, and, in the case of a computer system interconnected through a local Ethernet to the Internet, the Ethernet/IEEE 802.3u protocol 1150 may be used for transmitting and receiving information from the computer system to the complex communications components of the Internet. Within cloud 1110, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 1152. The datagram may generally include a header 1154 as well as the data 1156, encoded as a sequence of bytes within a block of memory. The header 1154 is generally a record composed of multiple byte-encoded fields. The call by the application program to an application-layer system call is represented in FIG. 11 by solid vertical arrow 1158. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 1160 includes a transport-layer-message header 1162 and an application-layer datagram 1152. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 1164, each including an Internet-layer header 1166 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 1164 into a link-layer datagram 1170 that includes a link-layer header 1172 and generally includes a number of additional bytes 1174 appended to the end of the Internet-layer datagram. The link-layer header includes collision-control and error-control information as well as local-network addresses. The link-layer packet or datagram 1170 is a sequence of bytes that includes information introduced by each of the layers of the protocol stack as well as the actual data that is transferred from the source computer to the destination computer according to the application-layer protocol.

Figure 12:
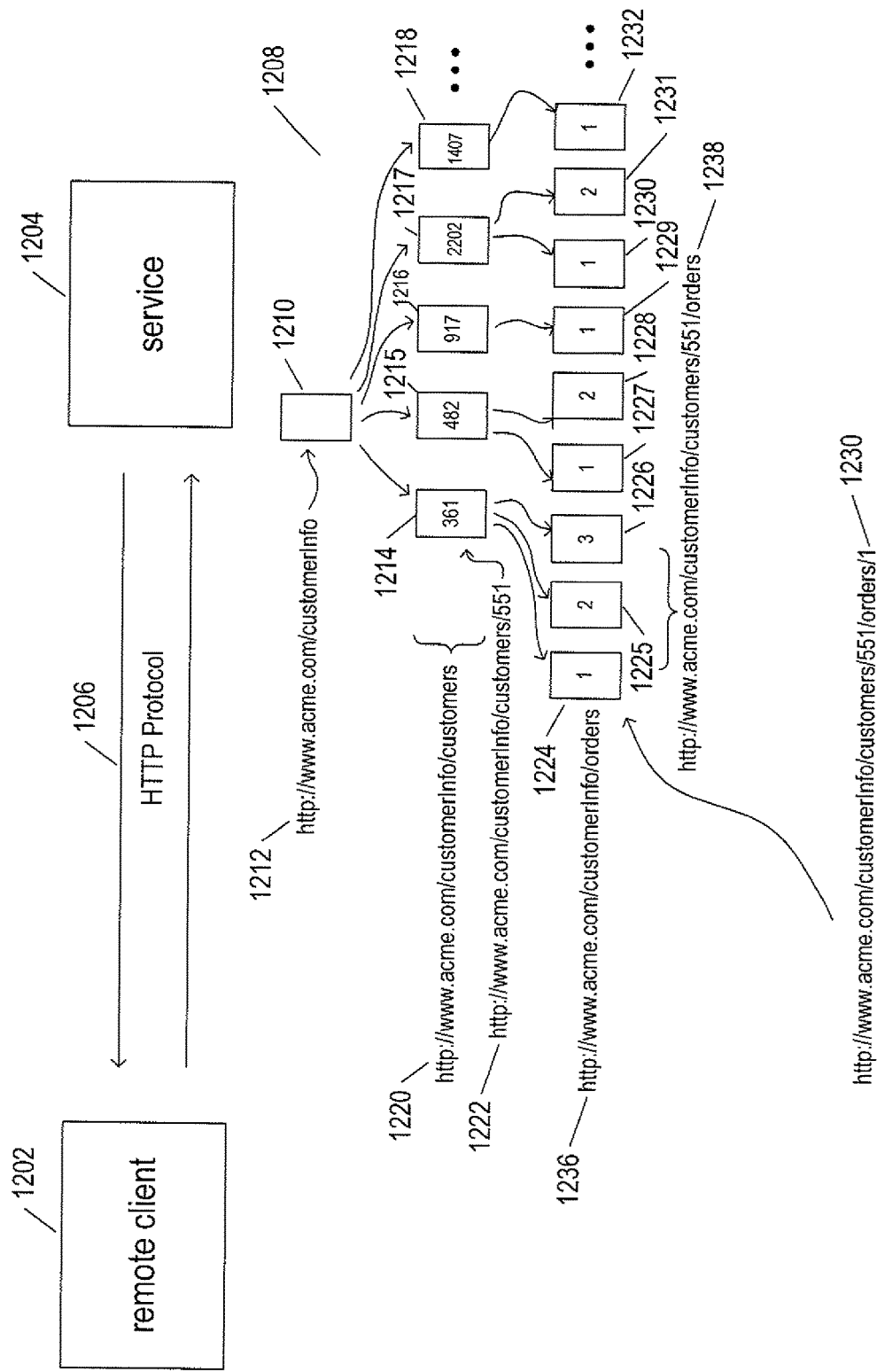
FIG. 12 illustrates the role of resources in RESTful APIs.

Next, the RESTful approach to web-service APIs is described, beginning with FIG. 12. FIG. 12 illustrates the role of resources in RESTful APIs. In FIG. 12, and in subsequent figures, a remote client 1202 is shown to be interconnected and communicating with a service provided by one or more service computers 1204 via the HTTP protocol 1206. Many RESTful APIs are based on the HTTP protocol. Thus, the focus is on the application layer in the following discussion. However, as discussed above with reference to FIG. 12, the remote client 1202 and service provided by one or more server computers 1204 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service are addressed by a domain name included in a uniform resource identifier ("URI"), as farther discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, and other such entities that can be described and characterized by digitally encoded information. A resource is thus a logical entity. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is an employee of a company, the representation of the resource may be one or more records, each containing one or more fields that store information characterizing the employee, such as the employee's name, address, phone number, job title, employment history, and other such information.

In the example shown in FIG. 12, the web servers 1204 provides a RESTful API based on the HTTP protocol 1206 and a hierarchically organized set of resources 1208 that allow clients of the service to access information about the customers and orders placed by customers of the Acme Company. This service may be provided by the Acme Company itself or by a third-party information provider. All of the customer and order information is collectively represented by a customer information resource 1210 associated with the URI "http://www.acme.com/customerInfo" 1212. As discussed further, below, this single URI and the HTTP protocol together provide sufficient information for a remote client computer to access any of the particular types of customer and order information stored and distributed by the service 1204. A customer information resource 1210 represents a large number of subordinate resources. These subordinate resources include, for each of the customers of the Acme Company, a customer resource, such as customer resource 1214. All of the customer resources 1214-1218 are collectively named or specified by the single URI "http://www.acme.com/customerInfo/customers" 1220. Individual customer resources, such as customer resource 1214, are associated with customer-identifier numbers and are each separately addressable by customer-resource-specific URIs, such as URI "http://www.acme.com/customerInfo/customers/361" 1222 which includes the customer identifier "361" for the customer represented by customer resource 1214. Each customer may be logically associated with one or more orders. For example, the customer represented by customer resource 1214 is associated with three different orders 1224-1226, each represented by an order resource. All of the orders are collectively specified or named by a single URI "http://www.acme.com/customerInfo/orders" 1236. All of the orders associated with the customer represented by resource 1214, orders represented by order resources 1224-1226, can be collectively specified by the URI "http://www.acme.com/customerInfo/customers/361/orders" 1238. A particular order, such as the order represented by order resource 1224, may be specified by a unique URI associated with that order, such as URI "http://www.acme.com/customerInfo/customers/361/orders/1" 1240, where the final "1" is an order number that specifies a particular order within the set of orders corresponding to the particular customer identified by the customer identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

Figure 13A:
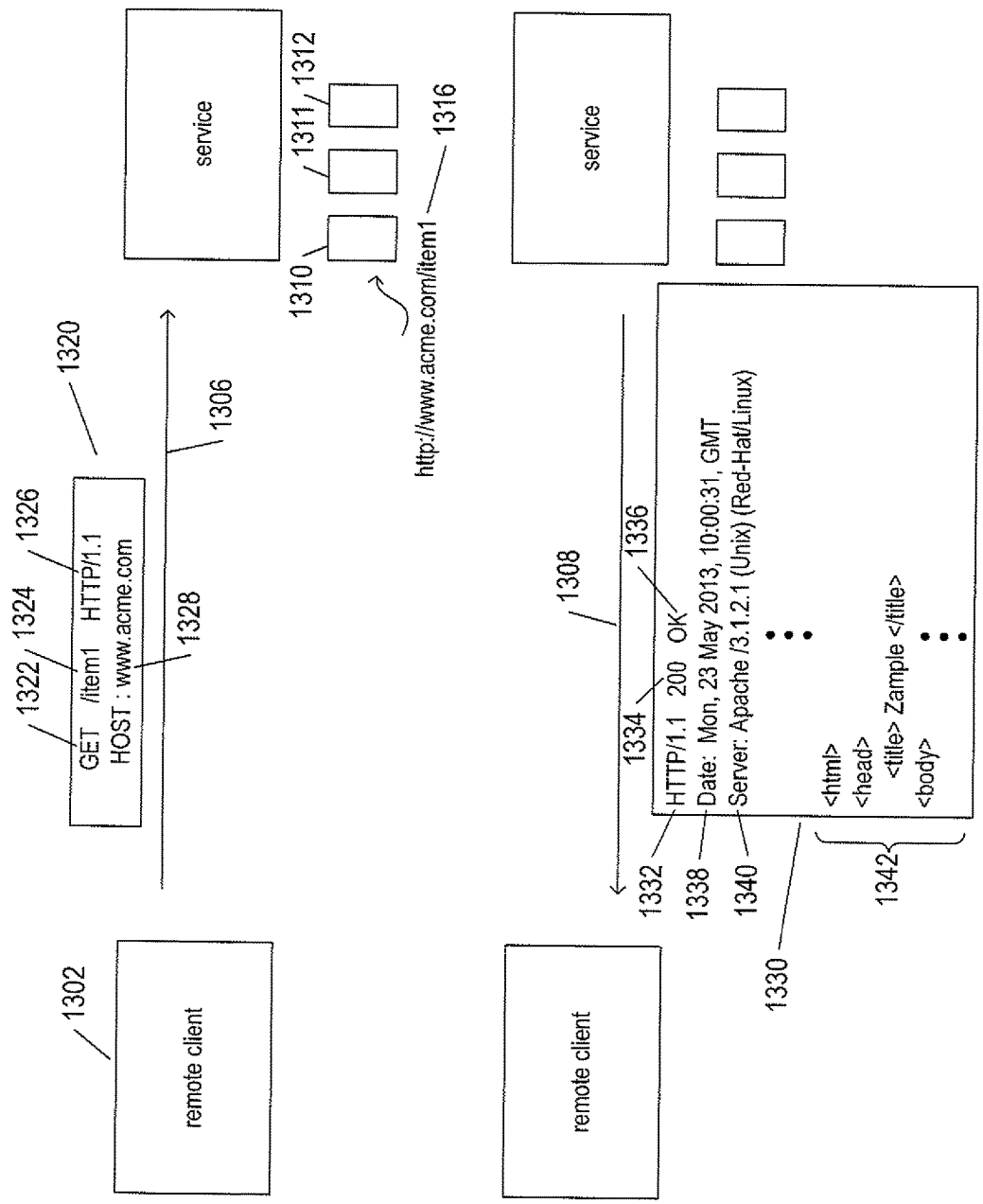
FIGS. 13A-D illustrate four basic verbs, or operations, provided by the HTTP application-layer protocol used in RESTful applications.
Figure 13B:
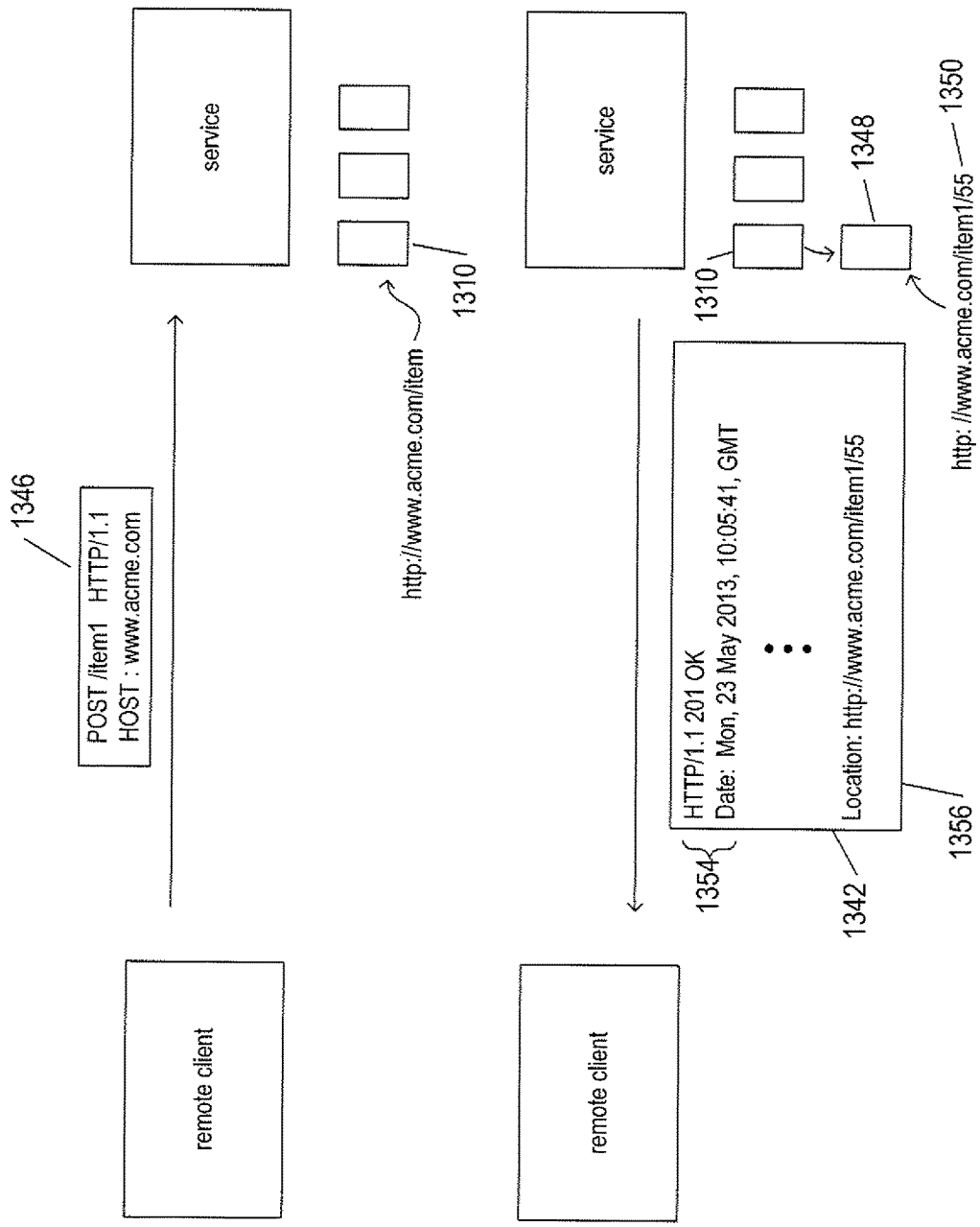
Figure 13C:
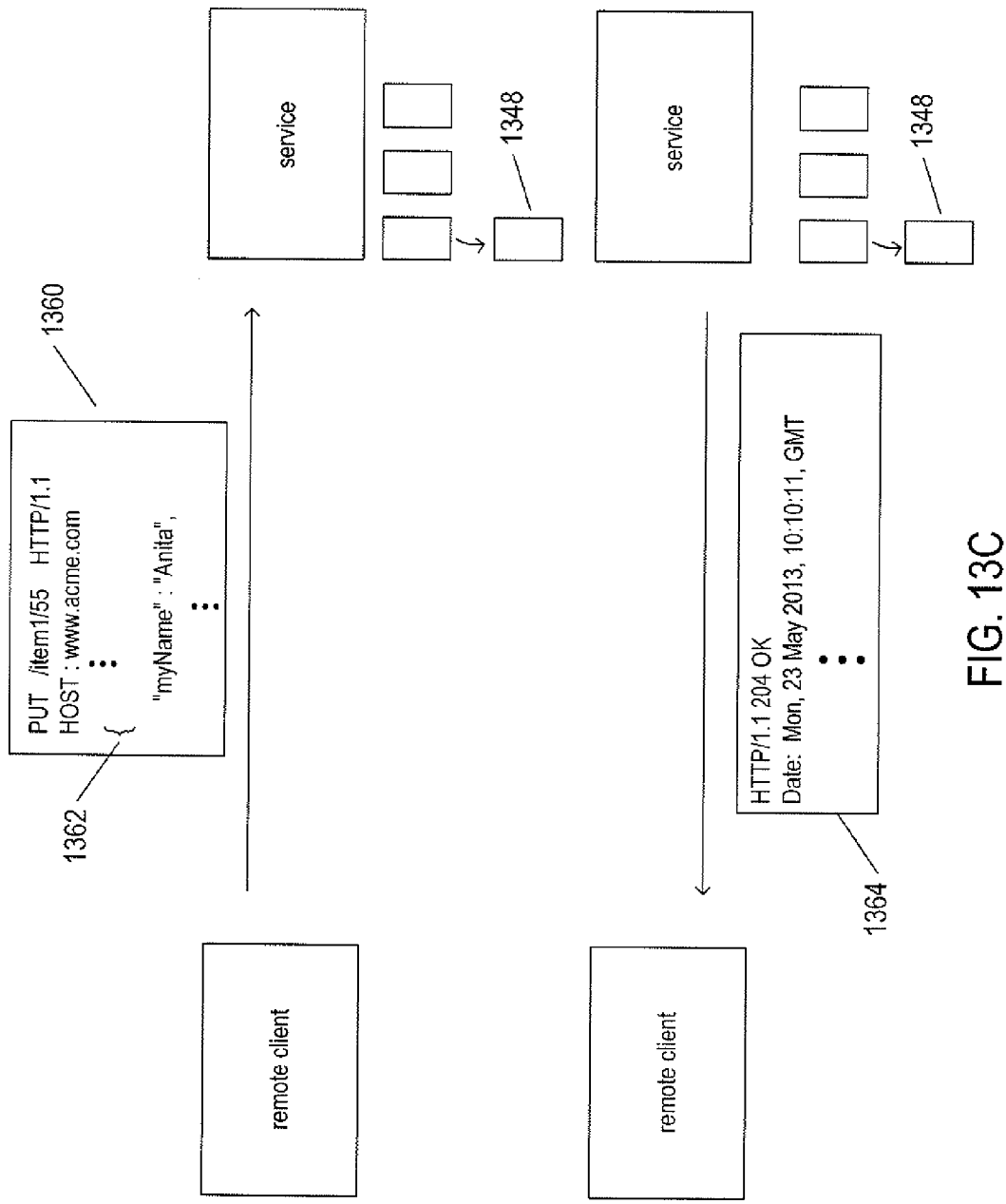

In the example RESTful API illustrated in FIG. 12, a client computer can use the verbs, or operations, of the HTTP protocol and the top-level URI 1212 to navigate the entire hierarchy of resources 1208 in order to obtain information about particular customers and about FIGS. 13A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 13A-C use the illustration conventions discussed above with reference to FIG. 12 with regard to the client, service, and HTTP protocol. For simplicity and clarity of illustration, in each of these figures, a top portion illustrates the request and a lower portion illustrates the response. The remote client 1302 and service 1304 are shown as labeled rectangles, as in FIG. 12. A right-pointing solid arrow 1306 represents sending of an HTTP request message from a remote client to the service and a left-pointing solid arrow 1308 represents sending of a response message corresponding to the request message by the service to the remote client. For clarity and simplicity of illustration, the service 1304 is shown associated with a few resources 1310-1312.

FIG. 13A illustrates the GET request and a typical response. The GET request requests the representation of a resource identified by a URI from a service. In the example shown in FIG. 13A, the resource 1310 is uniquely identified by the URI "http://www.acme.com/item1" 1316. The initial substring "http://www.acme.com" is a domain name that identifies the service. Thus, URI 1316 can be thought of as specifying the resource "item1" that is located within and managed by the domain "www.acme.com." The GET request 1320 includes the command "GET" 1322, a relative resource identifier 1324 that, when appended to the domain name, generates the URI that uniquely identifies the resource, and in an indication of the particular underlying application-layer protocol 1326. A request message may include one or more headers, or key/value pairs, such as the host header 1328 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 1330. The response message includes an indication of the application-layer protocol 1332, a numeric status 1334, a textural status 1336, various headers 1338 and 1340, and, in the current example, a body 1342 that includes the HTML encoding of a web page. Again, however, the body may contain any of many different types of information, such as a JSON object that encodes a personnel file, customer description, or order description. GET is the most fundamental and generally most often used verb, or function, of the HTTP protocol.

FIG. 13B illustrates the POST HTTP verb. In FIG. 13B, the client sends a POST request 1346 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 13B, the service creates a new resource 1348 subordinate to resource 1310 specified by URI "http://www.acme.com/item1," and assigns an identifier "36" to this new resource, creating for the new resource the unique URI "http://www.acme.com/item1/36" 1350. The service then transmits a response message 1352 corresponding to the POST request back to the remote client. In addition to the application-layer protocol, status, and headers 1354, the response message includes a location header 1356 with the URI of the newly created resource. According to the HTTP protocol, the POST verb may also be used to update existing resources by including a body with update information. However, RESTful APIs generally use POST for creation of new resources when the names for the new resources are determined by the service. The POST request 1346 may include a body containing a representation or partial representation of the resource that may be incorporated into stored information for the resource by the service.

FIG. 13C illustrates the PUT HTTP verb. In RESTful APIs, the PUT HTTP verb is generally used for updating existing resources or for creating new resources when the name for the new resources is determined by the client, rather than the service. In the example shown in FIG. 13C, the remote client issues a PUT HTTP request 1360 with respect to the URI "http://www.acme.com/item1/36" that names the newly created resource 1348. The PUT request message includes a body with a JSON encoding of a representation or partial representation of the resource 1362. In response to receiving this request, the service updates resource 1348 to include the information 1362 transmitted in the PUT request and then returns a response corresponding to the PUT request 1364 to the remote client.

Figure 13D:
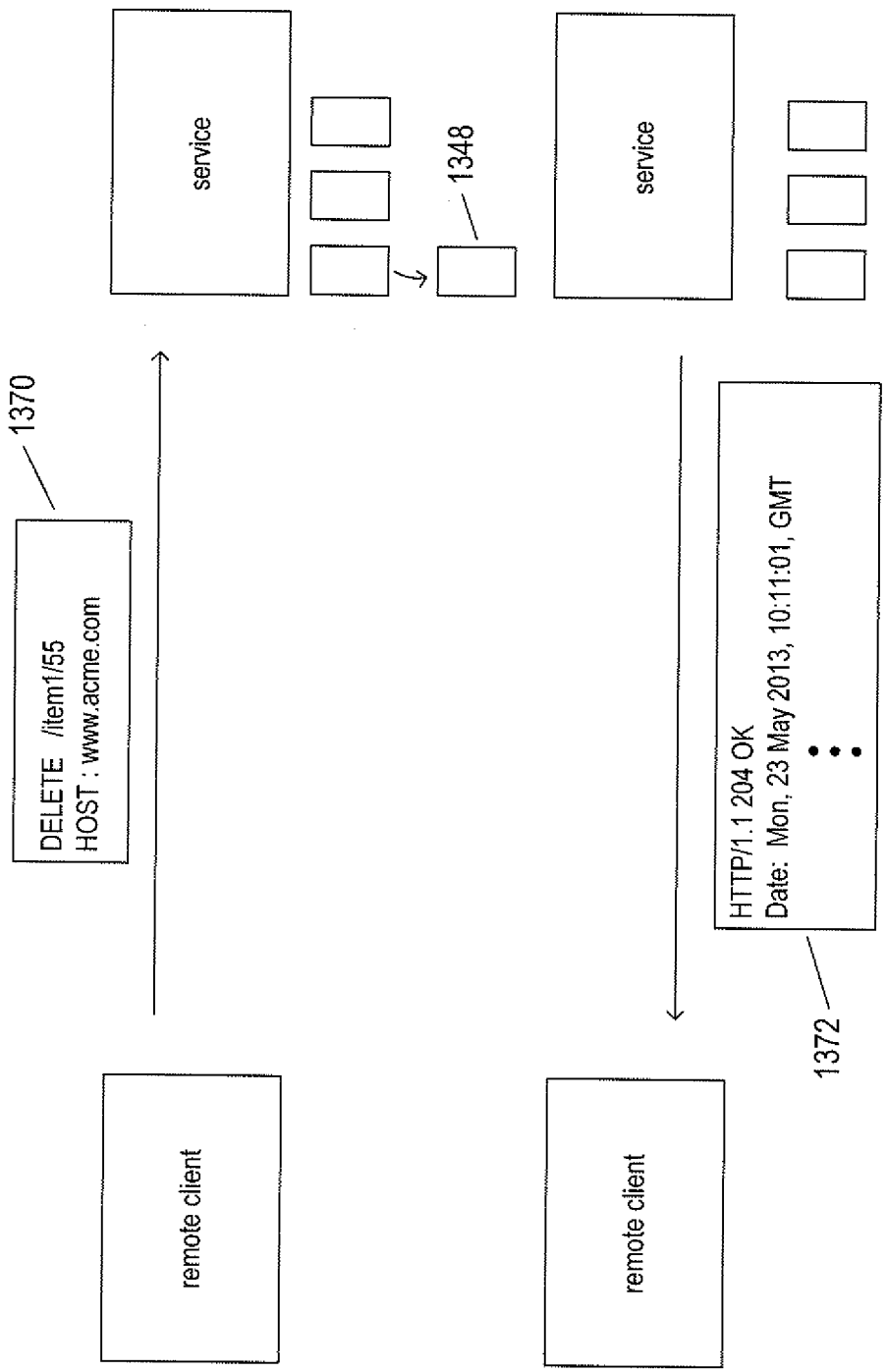

FIG. 13D illustrates the DELETE HTTP verb. In the example shown in FIG. 13D, the remote client transmits a DELETE HTTP request 1370 with respect to URI "http://www.acme.com/item1/36" that uniquely specifies newly created resource 1348 to the service. In response, the service deletes the resource associated with the URL and returns a response message 1372.

Automated Upgrade Subsystem Within a Distributed Computer System

Figure 14A:
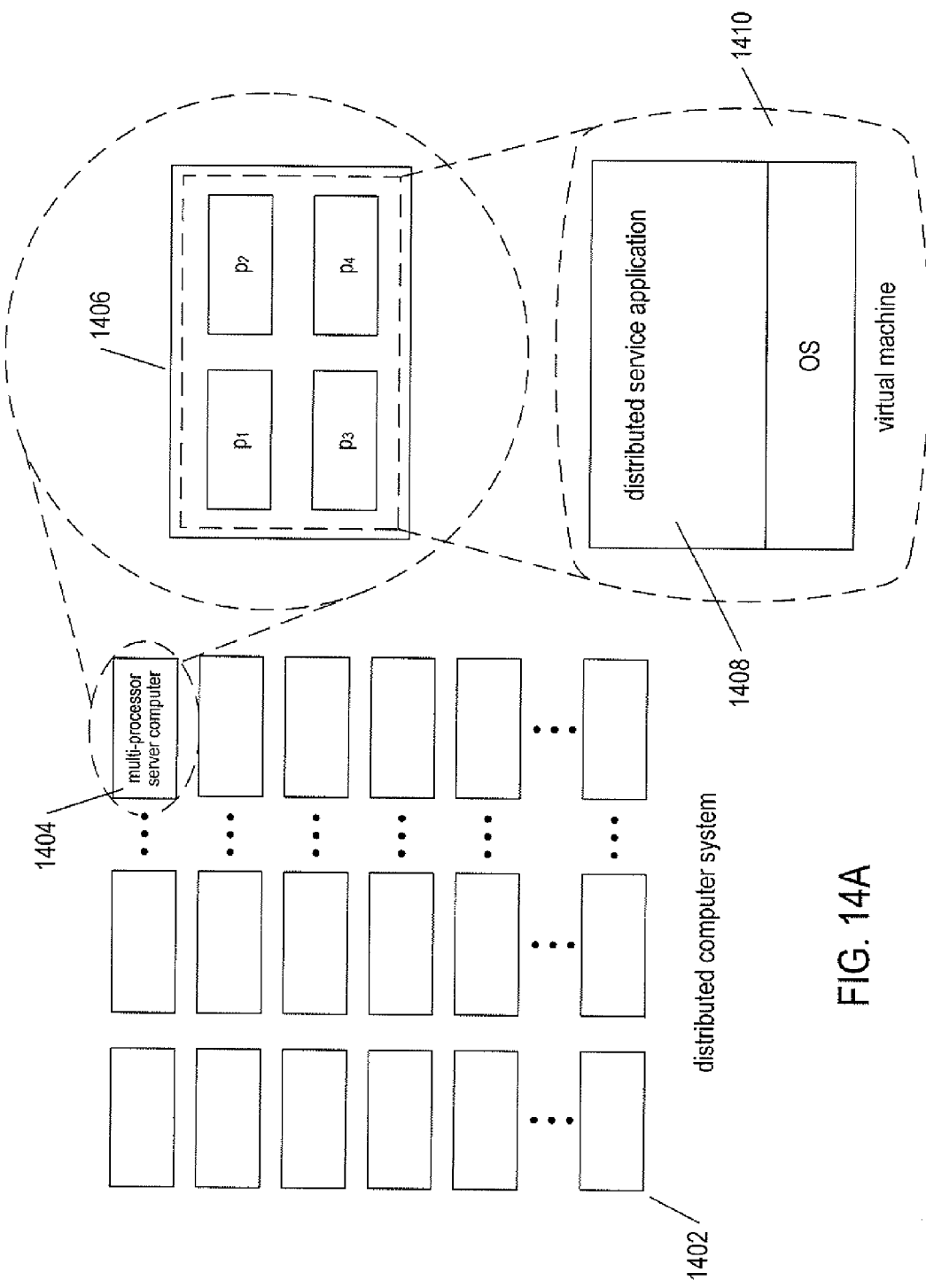
FIGS. 14A-B illustrate an example distributed, service-based application.

FIGS. 14A-13 illustrate an example distributed, service-based application. In FIG. 14A, a distributed computer system is represented as a large set of nodes 1402. Each node, such as node 1404, may be a multi-processor server computer 1406 or another type of physical computer system. Each instance of the example distributed service-based application 1408 runs within a virtual machine 1410 on one or more of the processors of the multi-processor server computer 1406. Thus, there may be many different instances of the distributed service-based application stored and executed within many different physical server computers across a distributed computer system. As discussed above, this poses many problems when the distributed service-based application is upgraded to a newer version. There are many stored, physical instances of the distributed service-based application that may need to be replaced or modified and the upgrade operation needs to take into account the possibility of failures and resulting upgrade and version states in which some of the instances of the distributed service-based application have been upgraded while others have not. Manual or semi-automated upgrade of distributed service-based applications is tedious and error-prone, at best, and nearly intractable, at worst, with the difficulties and complexities of upgrade often increasing at least geometrically as the number of instances of the distributed service-based application grows within increasingly large distributed computer systems.

Figure 14B:
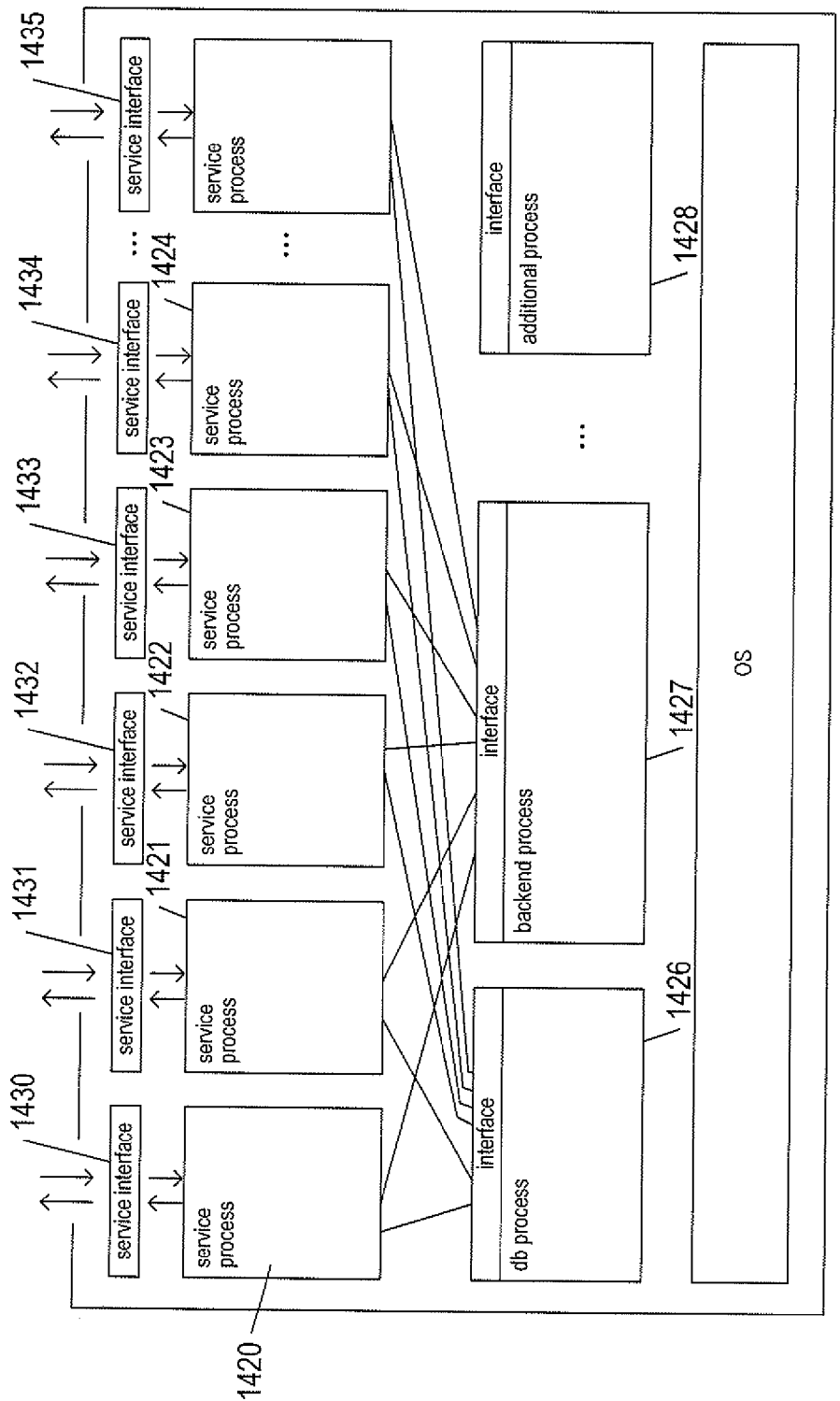

FIG. 14B illustrates an example instance of a distributed service-based application running within a virtual machine. The instance of the distributed service-based application includes many different processes or threads 1420-1428. The executables of many of the processes 1420-1425 may be separately stored within a physical server or other computer system within a distributed computer system. Service processes 1420-1425 communicate with remote computational entities through service interfaces 1430-1435 based on the RESTful protocol, described above, or other service-oriented protocols, including the Simple Object Access Protocol ("SOAP"). The service processes 1420-1425 communicate with internal processes, including a database process 1426, backend process 1427, and other such internal processes 1428 through additional, internal interfaces, often based on the RESTful protocol or other service-oriented protocols. There are generally multiple different processes based on multiple different executables within a single instance of a distributed, service-based application that may need to be updated during a distributed, service-based-application upgrade carried out on a distributed computer system.

Figure 15:
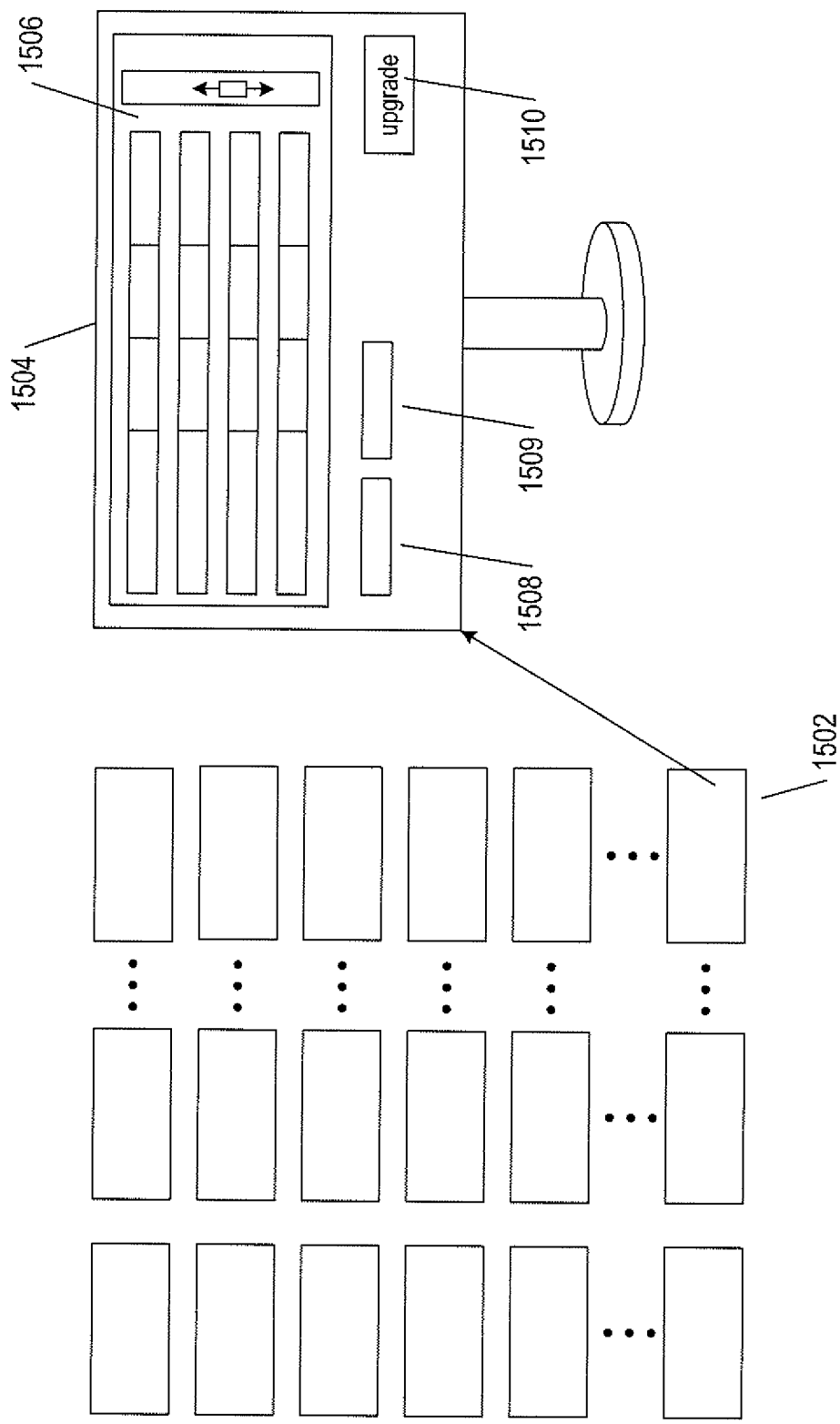
FIG. 15 illustrates the automated-upgrade approach represented by the currently disclosed automated upgrade subsystem and methods.

FIG. 15 illustrates the automated-upgrade approach represented by the currently disclosed automated upgrade subsystem and methods. As shown in FIG. 15, an upgrade service provided by one of the physical computer systems within a distributed computer system implements an automated distributed, service-based-application upgrade subsystem that provides an upgrade user interface 1504 to a system administrator or other user. This upgrade user interface allows the system administrator or other user to view the current version status of the distributed instances of the distributed service-based application within the distributed computer system 1506, to select a version to which to upgrade the distributed service-based application using input and display features 1508-1509, and to launch an automated upgrade of the distributed service-based application via input to a single upgrade feature 1510. The system administrator or other user is not required to understand the internal architecture of the distributed service-based application, including the number of different executables within instances of the distributed service-based application that need to be upgraded, and does not require manual intervention when the upgrade proceeds successfully. The automated upgrade subsystem keeps track of the version states of the instances of the distributed service application distributed across the distributed computer system and ensures that all of these instances, or a selected subset of the instances, are either fully upgraded or, in the event of problems that cannot be addressed during the upgrade process, returned to the pre-update version. In the general case, the distributed service-based application is upgraded while continuing to execute and service client requests, with individual instances or groups of instances upgraded sequentially, over time.

Figure 16A:
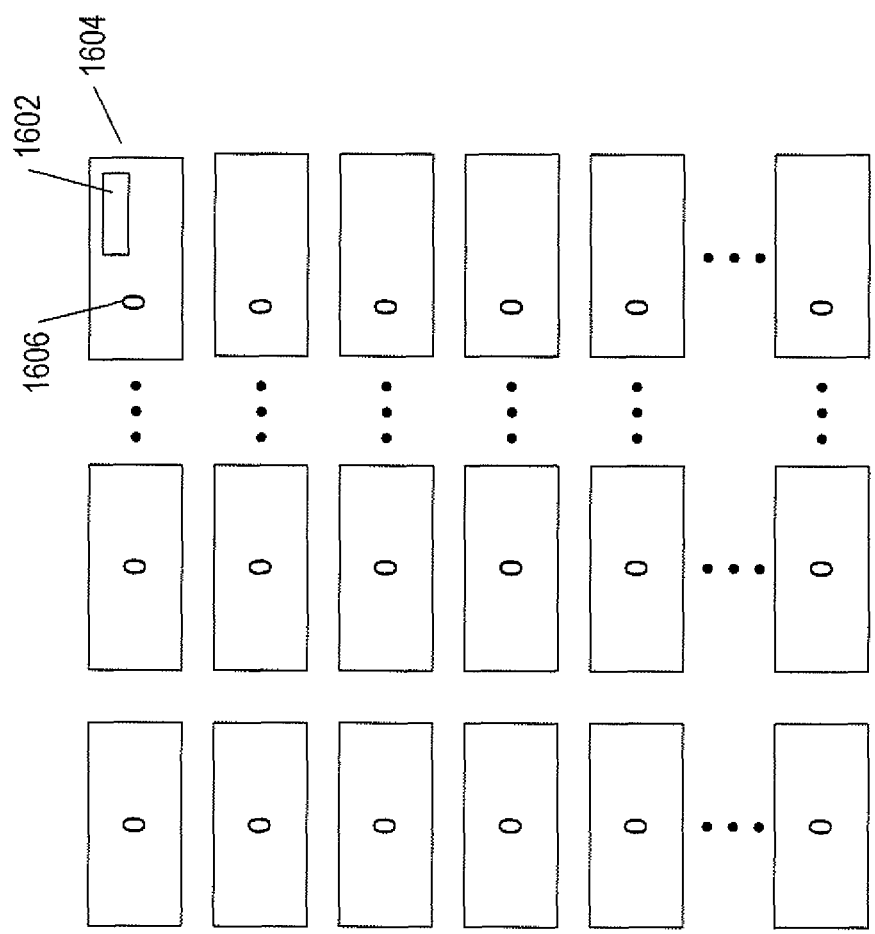

FIGS. 16A-K illustrate, using high-level block-diagram-based illustrations, certain features of the automated upgrade subsystem to which the current document is directed. FIGS. 16A-K use block-diagram illustration conventions used in FIGS. 14B-15. In addition, the symbol "O" is used to indicate an original version, or version of the distributed service-based application prior to launching an automated upgrade, and the symbol "UP" is used to indicate that a node, or physical server, has been upgraded to include the target version of the distributed service-based application of the upgrade process. It should be noted that, in certain implementations, the target version may differ for different instances of the distributed service-based application and that the original versions of different instances may also differ. However, in many cases, it is desirable for the instances of a distributed service-based application to share a common version. FIG. 16A shows the pre-upgrade-launch state of the distributed computer system. An upgrade controller 1602 has been identified for controlling the automated upgrade process within the distributed computer system 1604. All of the nodes of the distributed computer system shown in FIG. 16A currently contain instances of the distributed, service-based application with the pre-upgrade version, indicated by the symbol "O," such as the symbol "O" 1606 within node 1604.

Figure 16B:
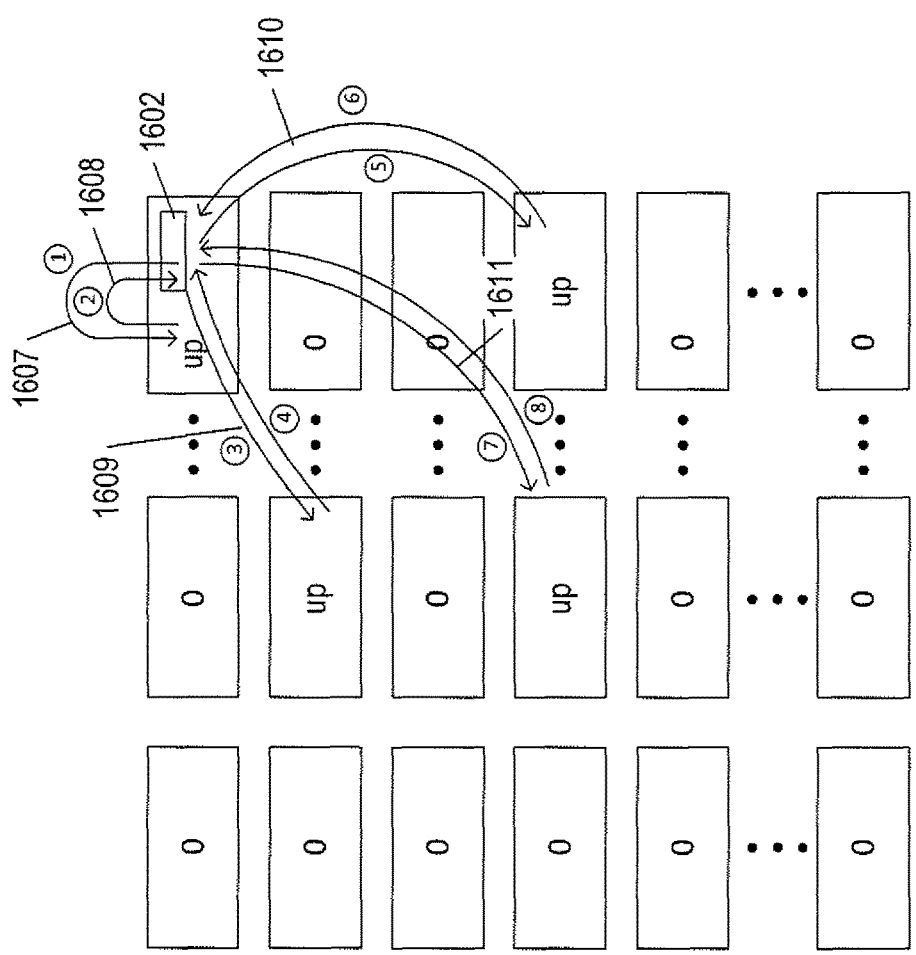
Figure 16C:
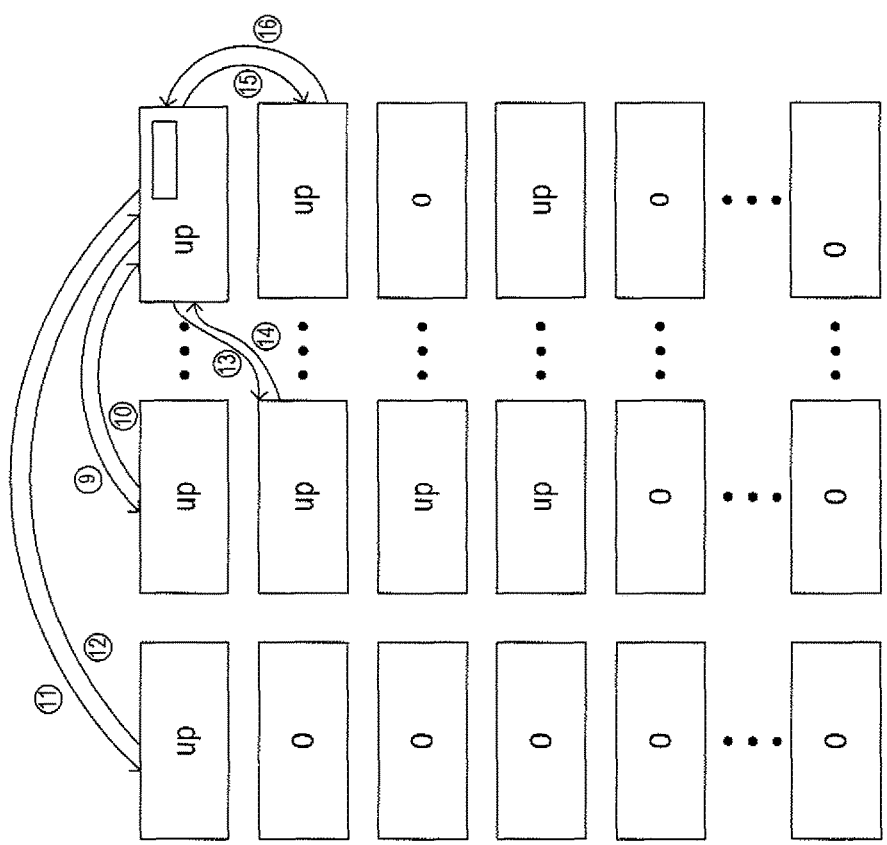
Figure 16D:
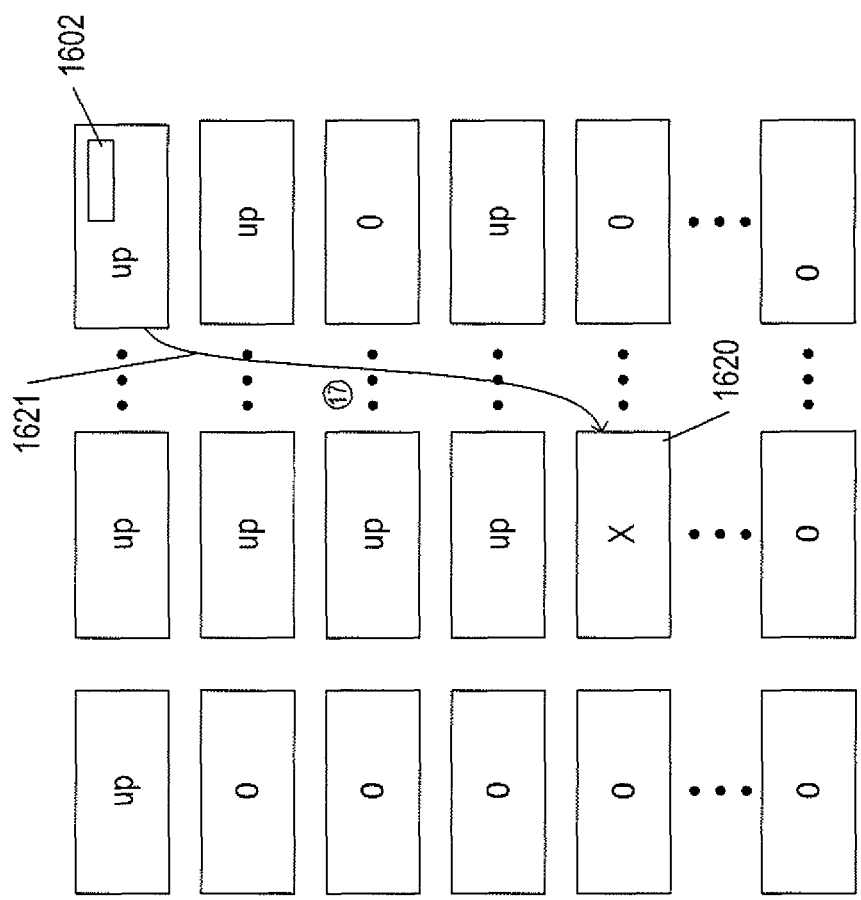
Figure 16E:
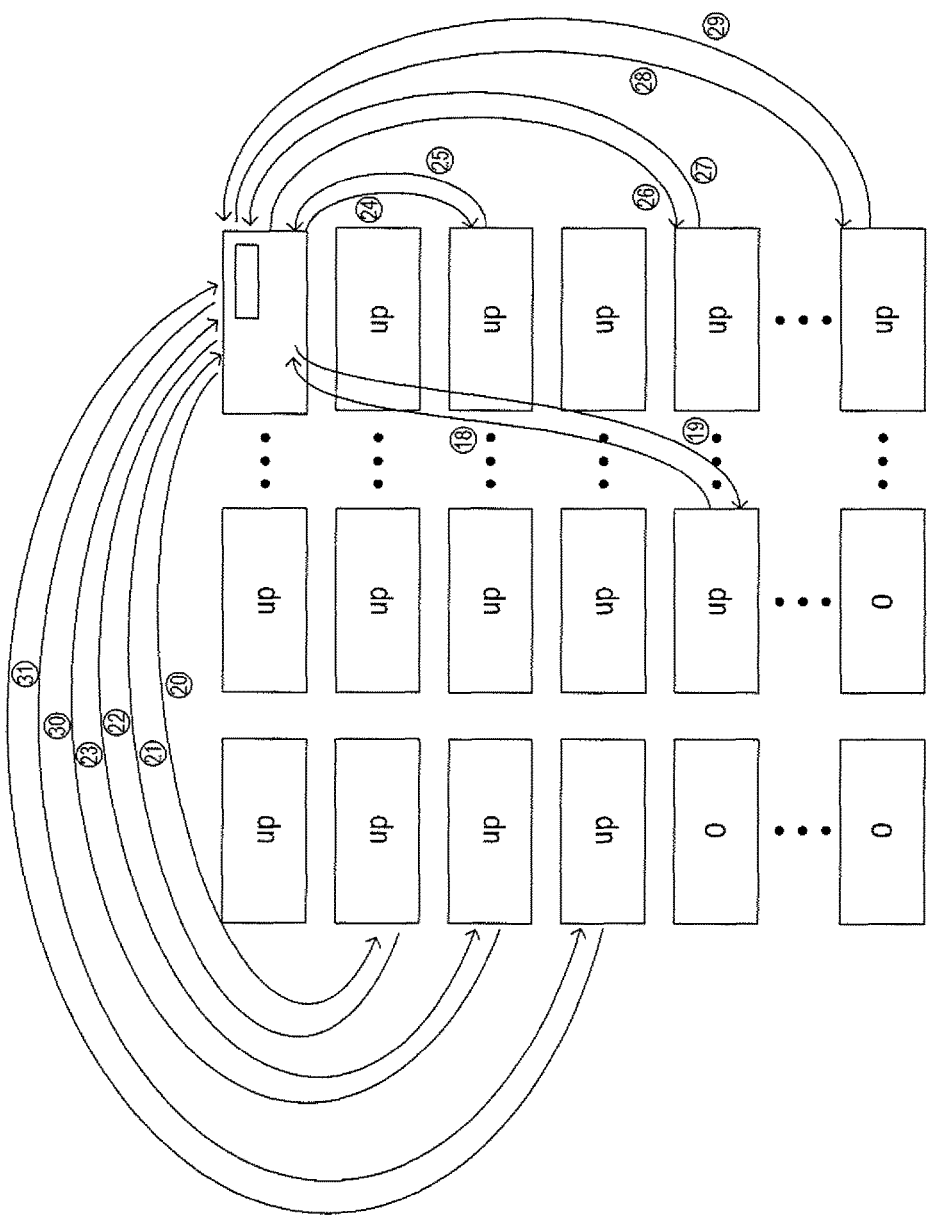
Figure 16F:
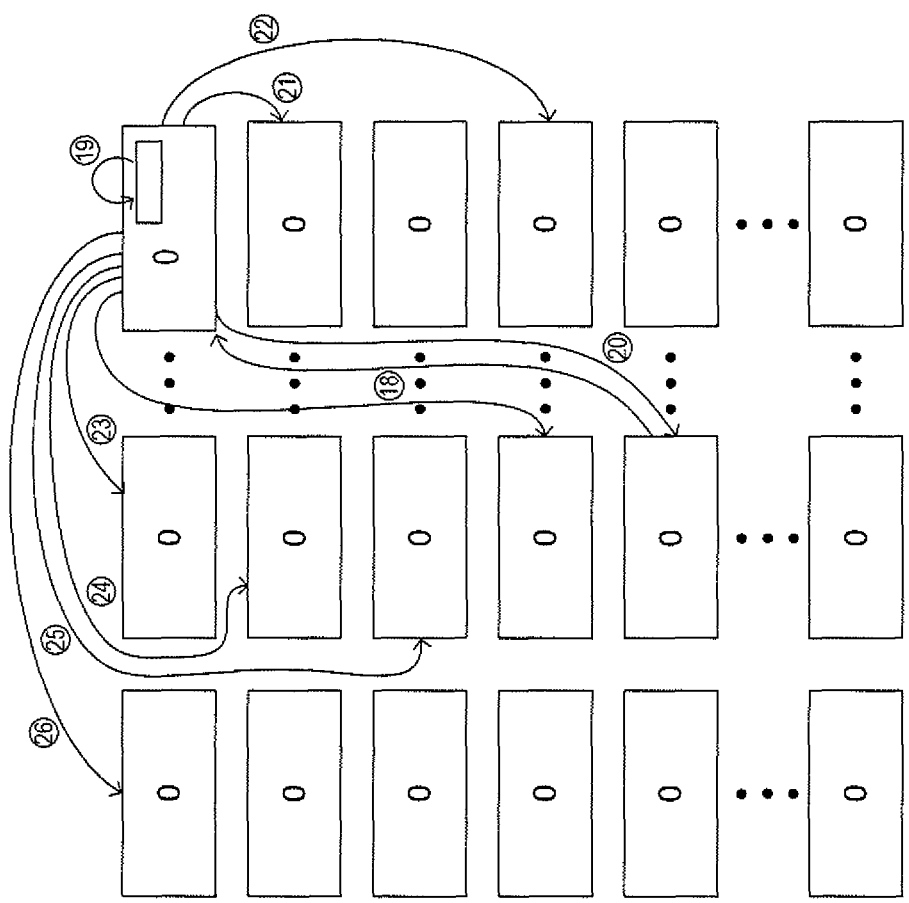

Initially, as represented by curved arrows 1607 and 1608 in FIG. 16B, the upgrade service 1602 requests that a highest-level upgrade service within the node in which it executes to upgrade itself and the node in which it resides. Then, as indicated by pairs of arrows 1609-1611, the upgrade sequentially upgrades the remaining nodes of the distributed computer system. In certain cases, the upgrade is strictly sequential, while, in other cases, the upgrade is carried out group-by-group. This process continues, as shown in FIG. 16C. In FIG. 16D, a problem occurs with node 1620 after the highest-level upgrade service has initiated upgrade 1621 of that node. This problem may arise from failures within node 1620 during the upgrade process, may arise from failures in network connectivity or in the communications protocol, or for a variety of other reasons. When such problems arise, an alert may be passed to the controller 1602, which may display an alert to the system administrator or user, via the upgrade user interface 1504, to initiate manual or semi-automated problem amelioration in the case that the problem cannot be automatically resolved within node 1620 or the highest-level upgrade service. As shown in FIG. 16E, when the problem is successfully addressed, either automatically, semi-automatically, or manually, the upgrade continues. However, when the problem cannot be addressed, the upgrade service initiates rollback operations on all of the already upgraded nodes to return these nodes to the original distributed service-based application version, represented by the symbol "O," as shown in FIG. 16F.

Figure 16H:
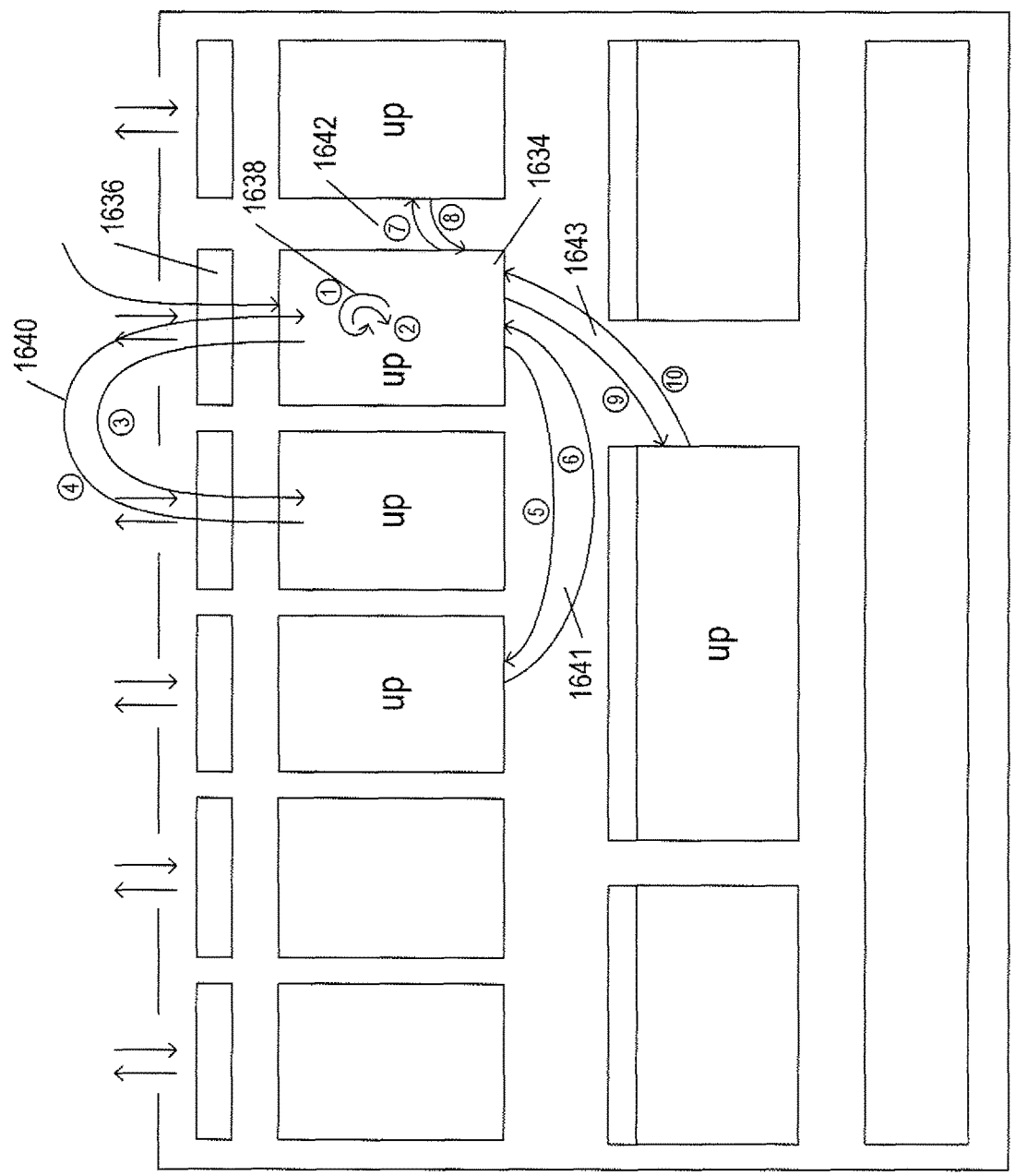
Figure 16I:
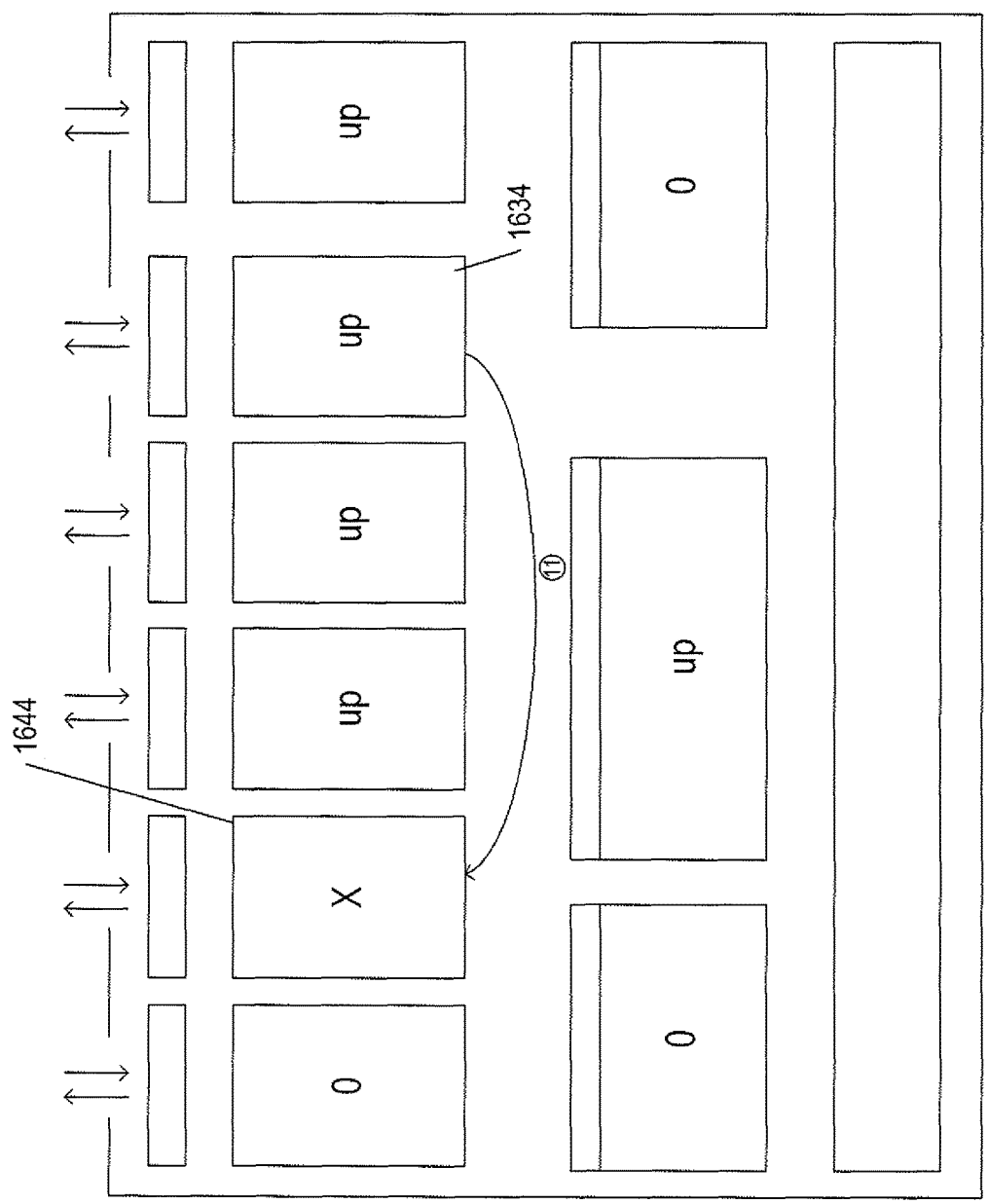
Figure 16J:
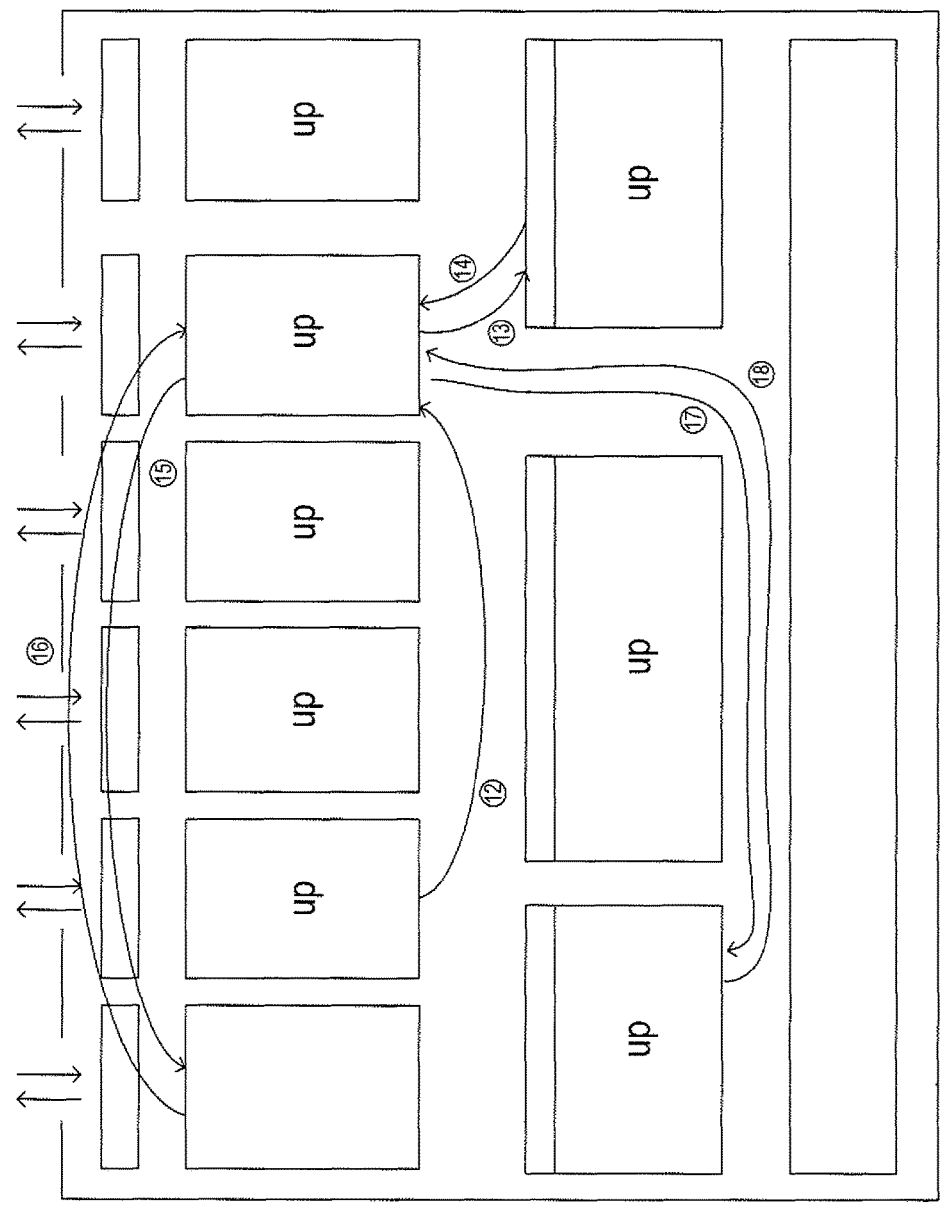
Figure 16K:
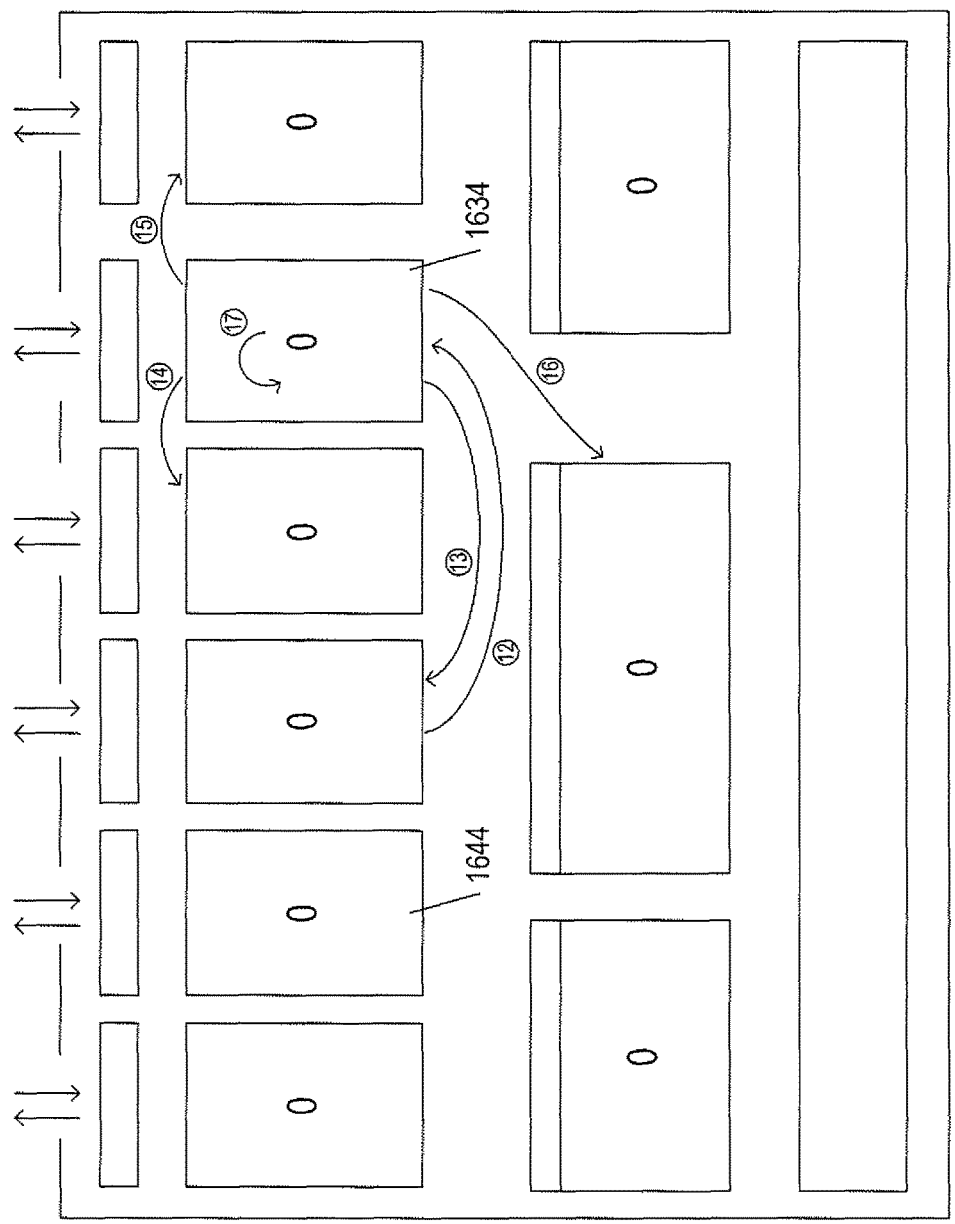

FIGS. 16G-K illustrate the upgrade process within a given node of the distributed computer system. As shown in FIG. 16G, prior to initiation of the upgrade process within the node, all of the processes have the pre-upgrade-version state represented by the symbol "O," such as the symbol "O" 1630 indicated for service process 1632. As shown in FIG. 16H, a local upgrade service 1634 receives an upgrade request through a service interface 1636, updates itself, as represented by the pair of curved arrows 1638, and then begins to upgrade remaining process instances within the local distributed service-based application instance, as represented by pairs of curved arrows 1640-1643. As shown in FIG. 16I, when the upgrade service attempts to upgrade service process 1644, a problem occurs. Just as described above with respect to FIG. 16D, the local upgrade-service process 1634 returns an alert through the highest-level upgrade service and controller 1602 to a system administrator or other user of the upgrade user interface when the problem cannot be resolved locally. When the problem is successfully addressed by intervention of the system administrator, or by non-local automated problem-resolution logic, the local upgrade proceeds, as shown in FIG. 16J. Otherwise, as shown in FIG. 16K, the local upgrade service 1634 initiates rollback operations on all nodes previously upgraded, including the service process 1644 that experienced the problem.

FIGS. 16A-K are intended to illustrate certain high-level features of the automated upgrade subsystem and methods to which the current document is directed. These features include a rolling, sequential upgrade of the many different instances of the distributed service-based application within a distributed computer system, generally while the distributed service-based application continues to execute, and issuing of alerts to attempt to address problems that cannot be resolved automatically, resulting in either resumption of the upgrade process or automatic rollback of any already-upgraded instances or of any instances that have begun to upgrade but failed to finish the upgrade process. As discussed below, there are numerous different states associated with the upgrade process and various types of message exchanges between the upgrade service that controls the upgrade process and local upgrade services. The automated upgrade subsystem and methods are extensible to further hierarchical levels and to various types of different configurations within local distributed service-application instances. For example, the automated upgrade service may be extended to upgrade a distributed service-based application on multiple, discrete distributed data centers. In this case, the upgrade controller selects a highest-level upgrade service within one distributed data center that directly interacts with local upgrade services on the other distributed data centers, and these local upgrade services then interact with subordinate upgrade services within each node of the data center or distributed computer system in which they reside. When the number and type of service processes active within a particular node varies, only the upgrade service local to that node needs to have awareness of the particular service processes and other processes within the local node. Individual service processes need not be aware of one another or of processes and other entities at higher or lower levels within a hierarchical upgrade environment. Thus, in many implementations, each process can be implemented to include a common upgrade-service interface, consisting of common upgrade-implementing function calls that can be differently implemented for different types of processes and other computational entities that are members of a distributed service-based application.

Figure 17:
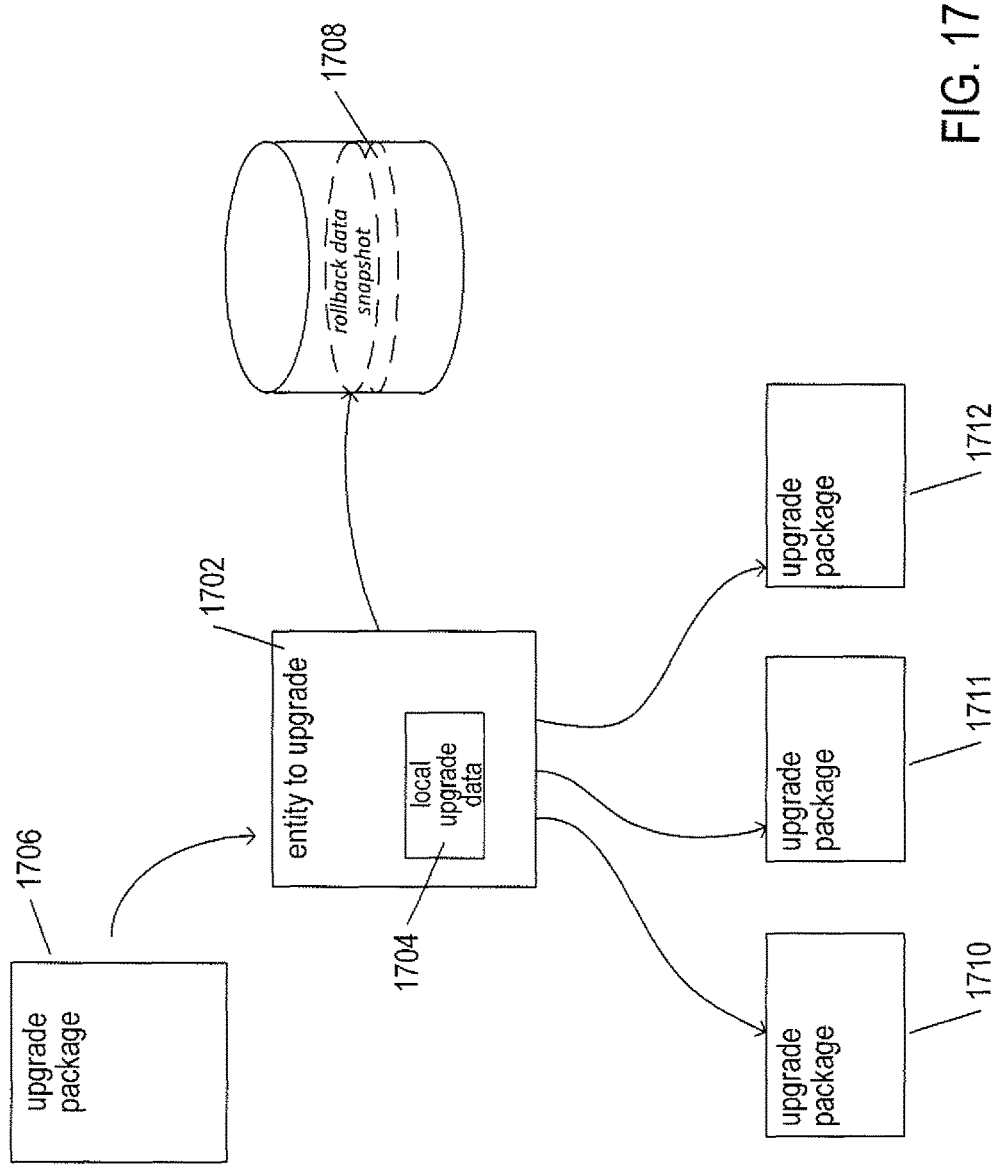
FIG. 17 illustrates certain of the information items input to, and output from, an entity of a distributed service-based application during the automated upgrade process.

FIG. 17 illustrates certain of the information items input to, and output from, an entity of a distributed service-based application during the automated upgrade process. An entity that is being upgraded 1702, such as a process within an instance of a distributed service-based application, generates certain local upgrade data 1704 in addition to rollback data and an entity snapshot 1706 that contains sufficient information to restore the entity to the pre-upgrade version state should the upgrade fail. The entity receives an upgrade package 1706 from a higher-level upgrade service controlling upgrade of the entity. This package includes sufficient information to store any new executable and data files in the local computational environment, such as a physical server, in order to create a persistent instance of the upgraded entity as well as upgrade scripts and other executables. When the entity that is being upgraded 1702 in turn controls upgrade of subordinate entities, the entity outputs upgrade packages 1710-1712 to those subordinate entities.

Figure 18:
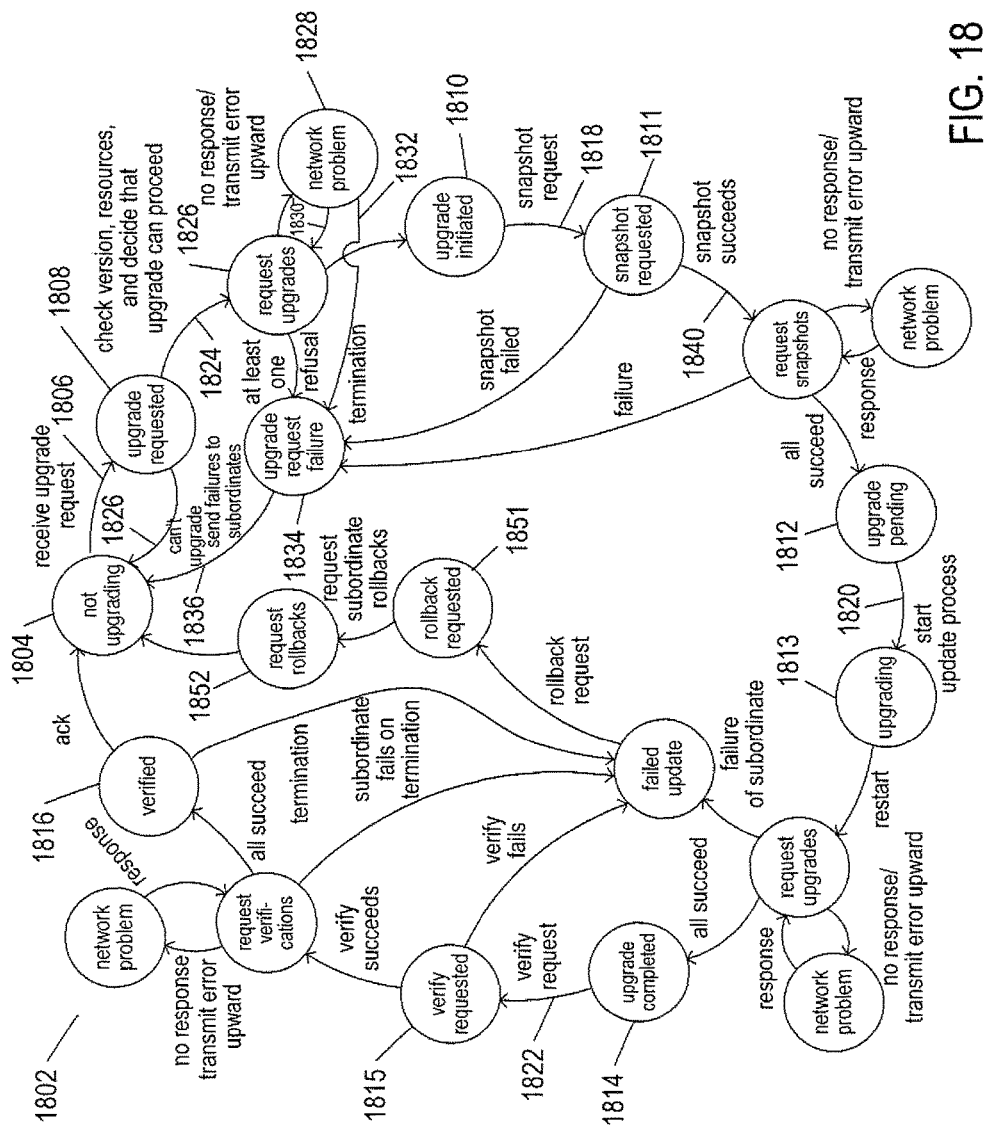
FIG. 18 shows a state-transition diagram for an entity of a distributed service-based application, such as a service process or other process, during an upgrade operation.

FIG. 18 shows a state-transition diagram for an entity of a distributed service-based application, such as a service process or other process, during an upgrade operation. In the state-transition diagram shown in FIG. 18 1802, states are represented by labeled disks, such as labeled disk 1804, and transitions are represented by curved arrows, such as curved arrow 1806. State 1804 is the NOT-UPGRADING state, a normal, operational state for a distributed service-based application component or entity. During the upgrade process, there are eight particularly significant states. The UPGRADE-REQUESTED state 1808 is entered when the entity receives an upgrade request from a higher-level upgrade service, represented by transition 1806. The UPGRADE-INITIATED state 1810 represents completion of initial tasks carried out by the entity in order to determine whether or not the requested upgrade is possible. The SNAPSHOT-REQUESTED state 1811 is entered upon receipt of a request to carry out a snapshot operation, represented by transition 1818. The UPGRADE-PENDING state 1812 is entered following successful snapshot creation. The UPGRADING state 1813 is entered following reception of a start-upgrade-process request, as represented by transition 1820. The UP GRADE-COMPLETED state 1814 is reached following successful completion of the upgrade operation. The VERIFY-REQUESTED state 1815 is entered following receipt of a verify request, represented by state transition 1822. The VERIFIED state 1816 is reached following successful verification. Thus, the upgrade process involves initial tasks directed to deciding whether or not the upgrade is possible, a snapshot operation, an upgrade operation, and a verification operation.

It should be noted that the states and transitions shown in the state-transition diagram in FIG. 18 are somewhat arbitrary. It would be possible to represent the state transitions with fewer or greater number of nodes, depending on how the many individual upgrade operations are classified together as an upgrade task associated with a node. Furthermore, certain of the operations are not reflected with transition arrows. For example, state transitions following successful completion of operations generally involve returning acknowledgements or success messages to the higher-level, controlling upgrade service.

In the UPGRADE-REQUESTED state 1808, the entity checks the current version, the current computational resources available for an upgrade operation, and other information and conditions in order to decide whether or not the entity can proceed with the requested upgrade, as represented by transition 1824. For example, when the entity is currently at a version several versions below the target version for the upgrade, the upgrade may not be possible, as a result of which the upgrade request is declined. As another example, the entity may lack sufficient resources to store a snapshot. When the upgrade request is declined, as represented by transition 1826, the entity returns to the not-upgrading state 1804. However, when the entity decides that the upgrade is possible, the entity then requests upgrades of each of the entity's subordinate entities, in the REQUEST-UPGRADES state 1826. When the entity is a lowest-level entity without subordinates, this state is bypassed and the entity proceeds to the UPGRADE-INITIATED state 1810. During the requests for subordinate entities to upgrade, when a network problem or other problem occurs, the entity transitions to the NETWORK-PROBLEM state 1828, from which the entity returns an alert to the higher-level controlling upgrade service. In the case that the problem is resolved, the entity returns to the REQUEST-UPGRADE state 1826, as represented by transition 1830. Otherwise, the entity transitions, via transition 1832, to the UPGRADE-REQUEST-FAILURE state 1834. From this state, the entity transmits failure notifications to any of the entity subordinates and then returns, via transition 1836, to the not-upgrading state 1804. The same pattern of completing the tasks associated with a state and then requesting that subordinate entities carry out those same tasks is repeated throughout the state-transition diagram. In the SNAPSHOT-REQUESTED state 1811, the entity creates and persistently stores snapshot information that includes scripts, executables, and data needed to roll back the version state of the entity to the pre-upload-request state, as represented by state transition 1840. In the UPGRADING state 1813, the entity persistently stores an indication that it is in the upgrading mode, persistently stores executables and data from the upgrade package to effect a transition to the target state, and then restarts itself to execute the target version. In the VERIFY-REQUESTED state 1815, the entity makes verification calls through a verification API in order that the entity's functionality is tested by another local or remote entity. For example, the verification process may involve the other local or remote entity directing requests to the entity under verification through its service interface. When the requests are successfully executed by the entity under verification, the entity under verification receives a verification-success indication from the other local or remote entity and transitions to the verified state 1816. In certain cases, an entity may also invoke internal self-verification and self-testing functionality.

When the upgrade and verification tasks fail, either in the entity or any of the entity's subordinates, a series of states and state transitions, including the FAILED_UPDATE 1850, ROLLBACK_REQUESTED 1851, and REQUEST_ROLLBACKS 1852 states, lead to a rollback of the distributed service-based application to the pre-upgrade version. In the described implementation, the rollback process generally succeeds, since snapshots have been successfully stored for all upgrading entities.

FIGS. 19A-H illustrate, using control-flow diagrams and a table, an implementation for the upgrade process carried out by each upgrade service for each component of a distributed service-based application according to the automated update subsystem and methods to which the current document is directed. As discussed above, the automated update process is hierarchical in nature, with a top-level upgrade service controlling update of the component in which it resides and directing upgrades of subordinate components through subordinate upgrade services that, in turn, direct upgrade requests to their subordinate upgrade services.

Figure 19A:
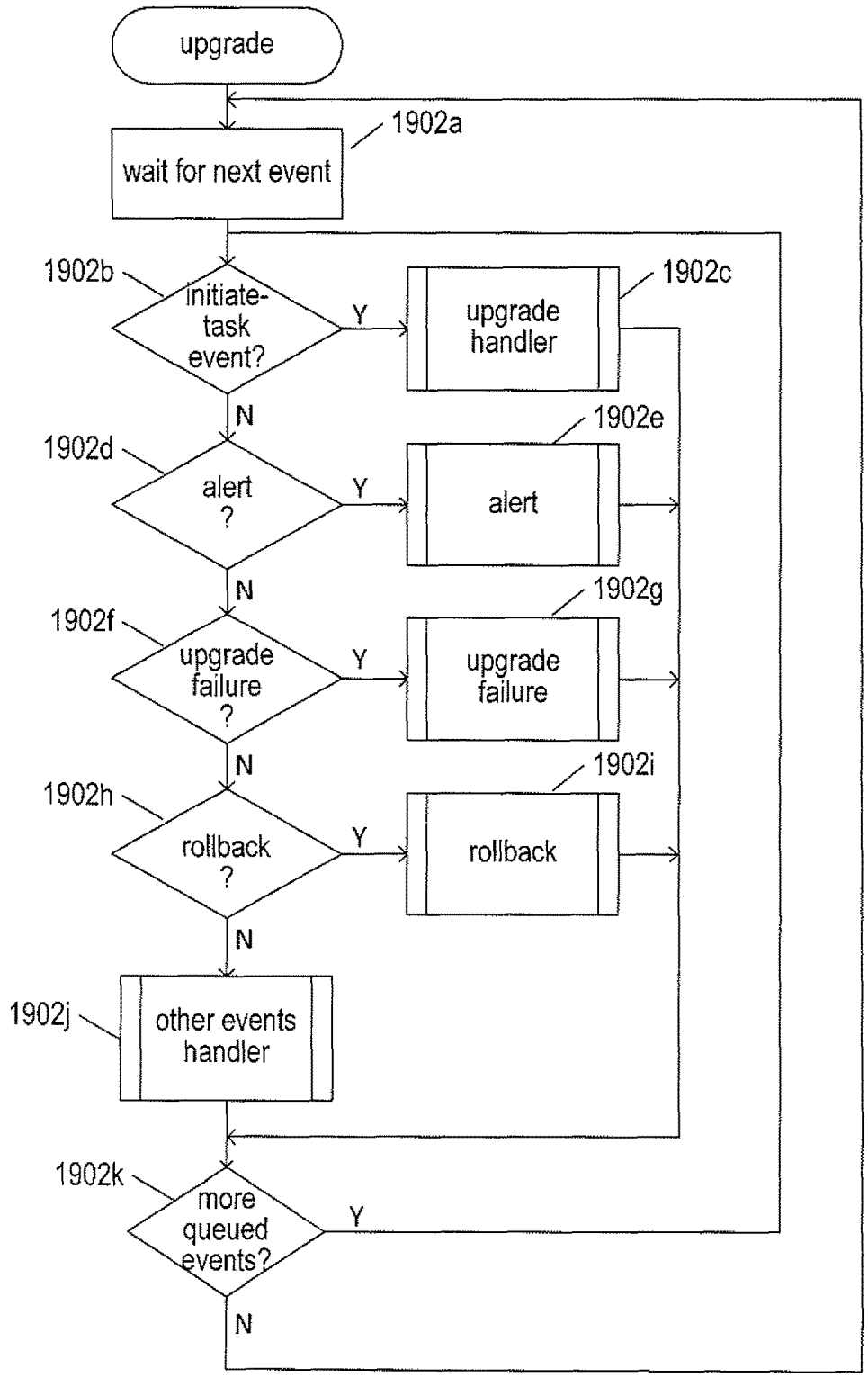

The upgrade service is modeled as an event loop. FIG. 19A provides a control-flow diagram for this event loop. In step 1902*a* the event loop waits for a next event to occur. When the next-occurring event is an initiate-task event, corresponding to the main transitions in the above-discussed state transition diagram shown in FIG. 18, as determined in step 1902*b*, an upgrade handler is called, in step 1902*c*, to handle the event. When the event is an alert, as determined in step 1902*d*, an alert handler is called, in step 1902*e*. When the next-occurring event is an upgrade-failure event, as determined in step 1902*f*, an upgrade-failure routine is called in step 1902*g*. When the next-occurring event is a rollback event, as determined in step 1902*h*, a rollback routine is called in step 1902*i*. All other events are handled by a default handler 1902*j*. When there are more queued events to handle, as determined in step 1902*k*, control returns to step 1902*b*. Otherwise control returns to step 1902*a*, where the event loop waits for a next event to occur.

Figure 19B:
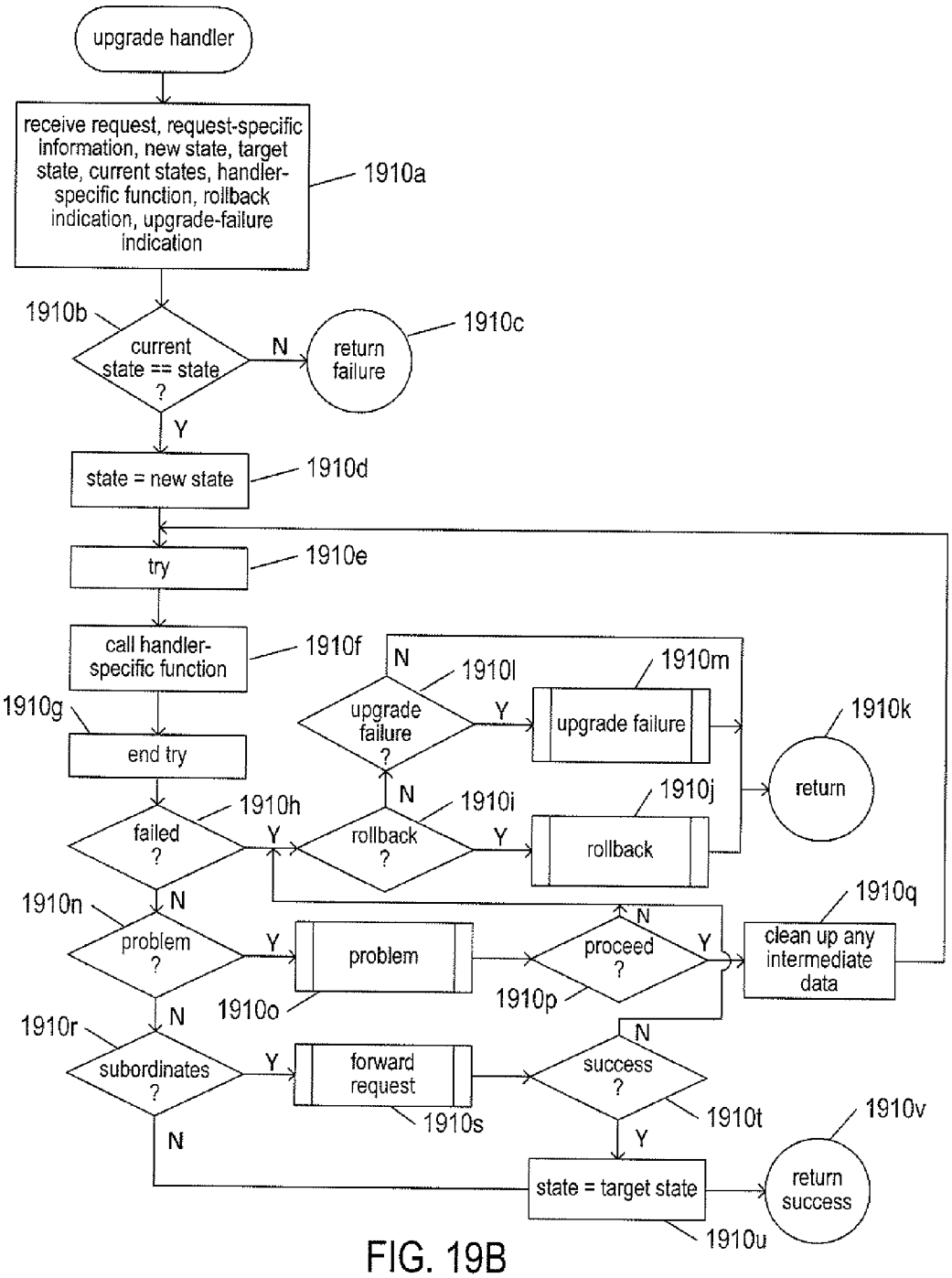

FIG. 19B provides a control-flow diagram for the upgrade handler called in step 1902*c*. This is a generic handler that handles four of the main state transitions. These particular state transitions are discussed, below, with reference to FIG. 1911, which provides a table of the argument values passed to the upgrade handler by the event loop to handle each specific transition. In step 1910*a*, the upgrade handler receives: a request to execute an upgrade task; request-specific information; new, target, and current states with respect to the upgrade task; a handler-specific function that carries out a specific task corresponding to a specific state transition; a rollback indication; and an upgrade-failure indication. When the current upgrade state of the component is not equal to the current-state parameter received in step 1910*a*, a failure response is returned in step 1910*c*. It should be noted that, in the currently described implementation, all of the return values for the handlers and routines are translated into RESTful protocol messages that are, in general, returned to the next-higher-level upgrade service controlling upgrade of the current component. When the current upgrade state of the component is equal to the current-state parameter, then the upgrade state of the component is set to the new-state parameter value, in step 1910*d*. In steps 1910*e*-1910*g*, the handler-specific function, a reference to which is received in step 1910*a*, is called to execute a particular task or state transition within a try block. When the handler-specific function fails to properly execute, as determined in step 1910*h*, and when the rollback indication indicates that a rollback should be carried out, as determined in step 1910*i*, the rollback routine is called in step 1910*j* and a failure is returned in step 1910*k*. When a rollback is not indicated, but when the upgrade-failure indication supplied in step 1910*a* indicates that an upgrade failure should be carried out, as determined in step 19101, the routine "upgrade failure" is called in step 1910*m* prior to returning a failure indication in step 1910*k*. When execution of the handler-specific function has encountered a problem, such as a network failure or other such problem that may be ameliorated either automatically or by system-administrator intervention, as determined in step 1910*n*, the routine "problem" is called, in step 1910*o*. When the routine "problem" returns an indication that the upgrade should proceed, as determined in step 1910*p*, then, in step 1910*q*, any intermediate data resulting from the failed execution of the handler-specific function is cleaned up and control returns to step 1910*e* to retry execution of the handler-specific function. Otherwise, control is directed to step 1910*i* to carry out a rollback or upgrade failure, when indicated, before returning a failure indication in step 1910*k*. Otherwise, when no problem has arisen, the handler-specific function has executed correctly. When there are subordinate components to the current component, as determined in step 1910*r*, the routine "forward request" is called, in step 1910*s*, in order to forward the currently requested task to the subordinate components. When this routine returns a success indication, as determined in step 1910*t*, the upgrade state of the component is set to the target state received in step 1910*a*, in step 1910*u*, and success is returned in step 1910*v*. When there are no subordinate components, as determined in step 1910*r*, control directly flows to step 1910*u*.

Figure 19C:
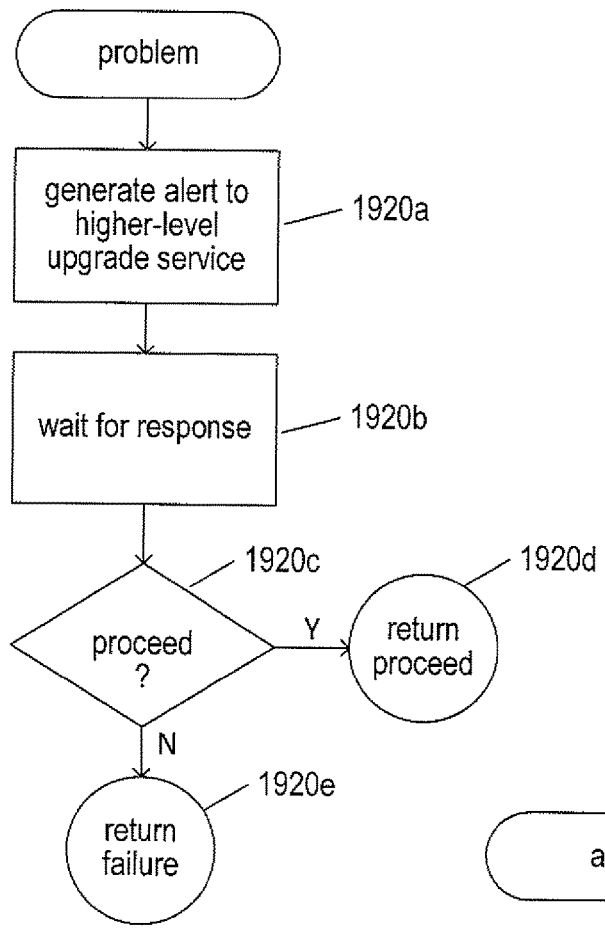

FIG. 19C provides a control-flow diagram for the routine "problem," called in step 1910*o* of FIG. 19B. In step 1920*a*, the routine "problem" generates an alert to the higher-level upgrade service controlling the current upgrade process or, in the case that the current upgrade process is being carried out by the highest-level upgrade service, to the user interface and control process. Then, in step 1920*b*, the routine "problem" waits for a response to the alert. When the response indicates that the problem has been addressed, as determined in step 1920*c*, the routine "problem" returns an indication to proceed with the upgrade in step 1920*d*. Otherwise, a failure indication is returned in step 1920*e*.

Figure 19D:
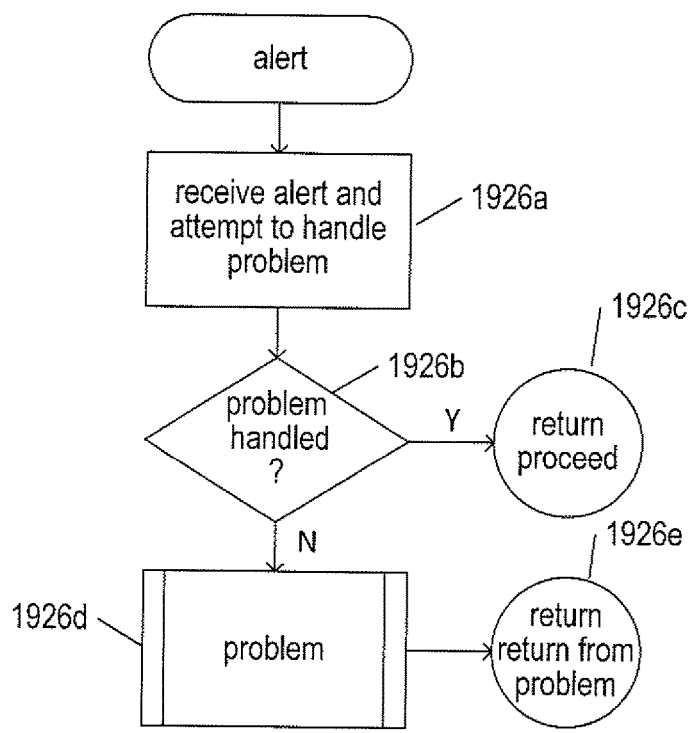

FIG. 19D provides a control-flow diagram for the routine "alert," called in step 1902*e* of FIG. 19A. In step 1926*a*, the routine "alert" receives an alert from a lower-level component and upgrade service and attempts to automatically handle whatever problem has occurred. When the problem is successfully handled, as determined in step 1926*b*, the routine "alert" returns an indication to proceed, in step 1926*c*. Otherwise, the routine "alert" calls the routine "problem," in step 1926*d* and returns whatever return value is returned by the routine "problem," in step 1926*e*. The routines "problem" and "alert" constitute a type of out-of-band alert or exception generating and handling process that allows the upgrade process to suspend or pause to allow certain types of problems that arise during the upgrade process to be handled.

Figure 19E:
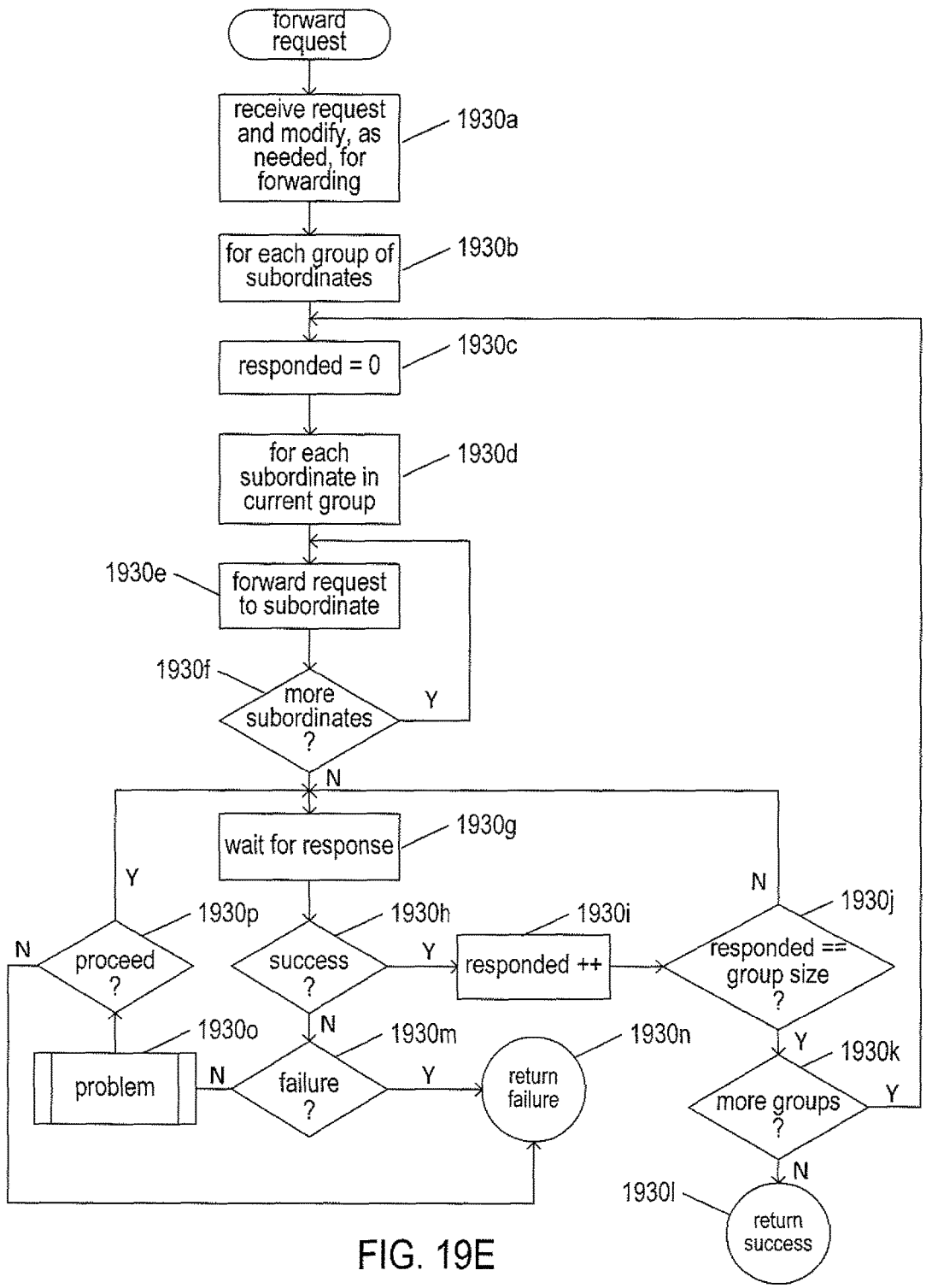

FIG. 19E provides a control-flow diagram for the routine "forward request," called in step 1910*s* of FIG. 19B. In step 1930*a*, the routine "forward request" receives a request to forward to subordinate components and their upgrade services and modifies the request, as needed, for forwarding. For example, in certain implementations, only a portion of the upgrade package may be distributed to subordinate components and their upgrade services. The request may be forwarded simultaneously to groups of subordinate components. In the outer for-loop of steps 1930*b*-1930*p*, each group of subordinate components to which the request is forwarded is considered. In step 1930*c*, the local variable responded is set to 0. Then, in the inner for-loop of steps 1930*d*-*f*, the request is forwarded to each subordinate component in the group. In step 1930*g*, the routine "forward request" waits for responses from the subordinate coordinates. When the next-received response is a success indication, as determined in step 1930*h*, the local variable responded is incremented, in step 1930*i*. When the current value of the local variable responded is equal to the group size, as determined in step 1930*j*, and when there are more groups of subordinates to which to forward the request, as determined in step 1930*k*, control returns to step 1930*c*. Otherwise, the routine "forward request" returns a success indication in step 19301. When, however, a subordinate component responds with a failure indication, as determined in step 1930*m*, the routine "forward request" returns a failure indication in step 1930*n*. Otherwise, a problem, such as a network failure, may have occurred. In this case, the routine "problem" is called in step 1930*o*. When this routine returns an indication to proceed with the upgrade, as determined in step 1930*p*, control returns to step 1930*g*. Otherwise, a failure is returned in step 1930*n*.

Figure 19F:
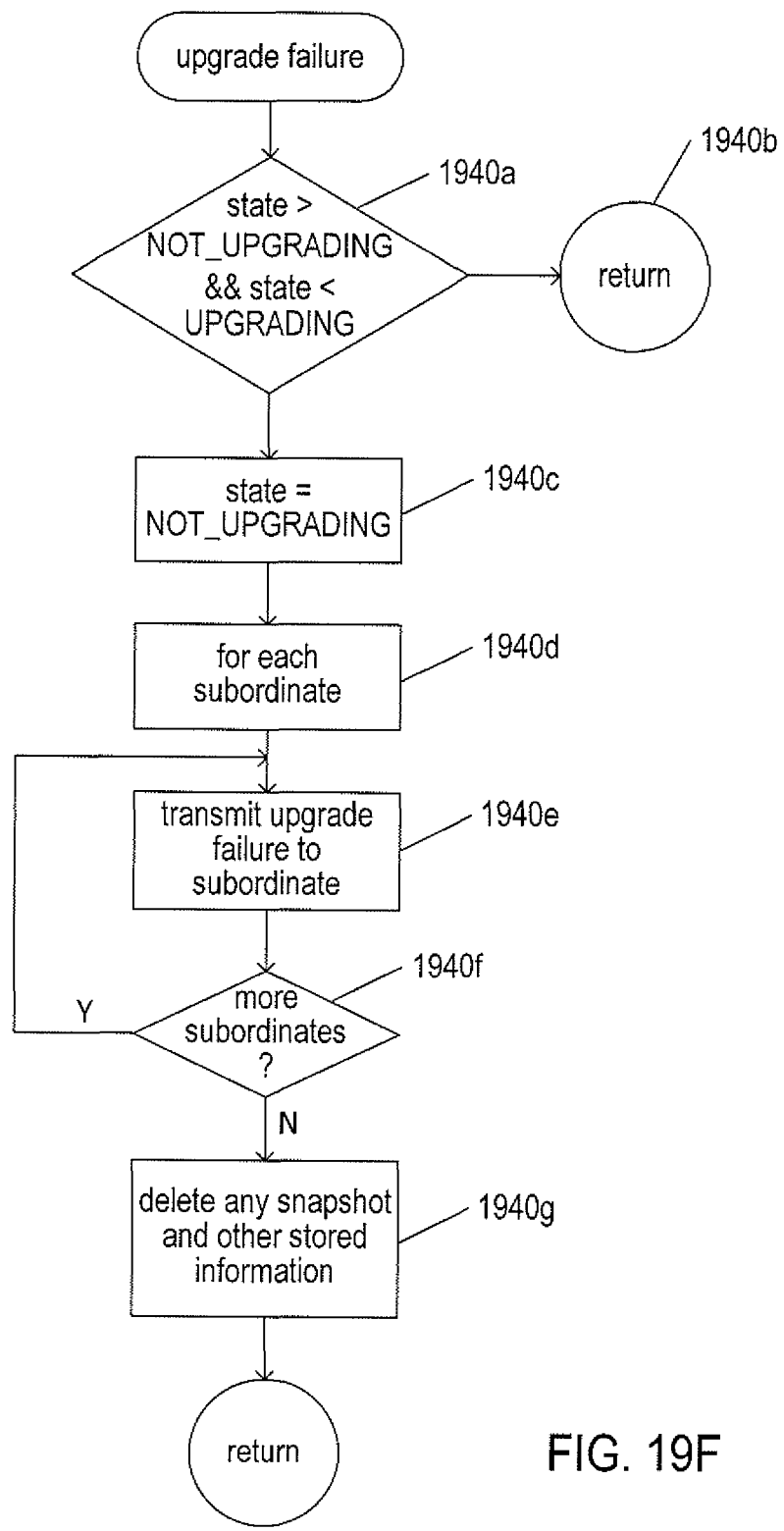

FIG. 19F provides a control-flow diagram for the routine "upgrade failure" called in step 1910*m* in FIG. 19B and in step 1902*g* of FIG. 19A. The upgrade failure is appropriate when the current upgrade state of the component is a state greater than NOT_UPGRADING but less than the state UPGRADING, as determined in step 1940*a*, assuming the states to have increasing numeric-value representations in a clockwise direction from the NOT_UPGRADING state in the state-transition diagram illustrated in FIG. 18. When the state is improper, the routine returns in step 1940*b*. Otherwise, in step 1940*c*, the upgrade state of the component is set to NOT_UPGRADING and, in the for-loop of steps 1940*d*-1940*f*, an upgrade-failure request is transmitted to all subordinate components and their upgrade services. In step 1940*g*, any snapshot and other information stored during the beginning of the upgrade process are deleted.

Figure 19G:
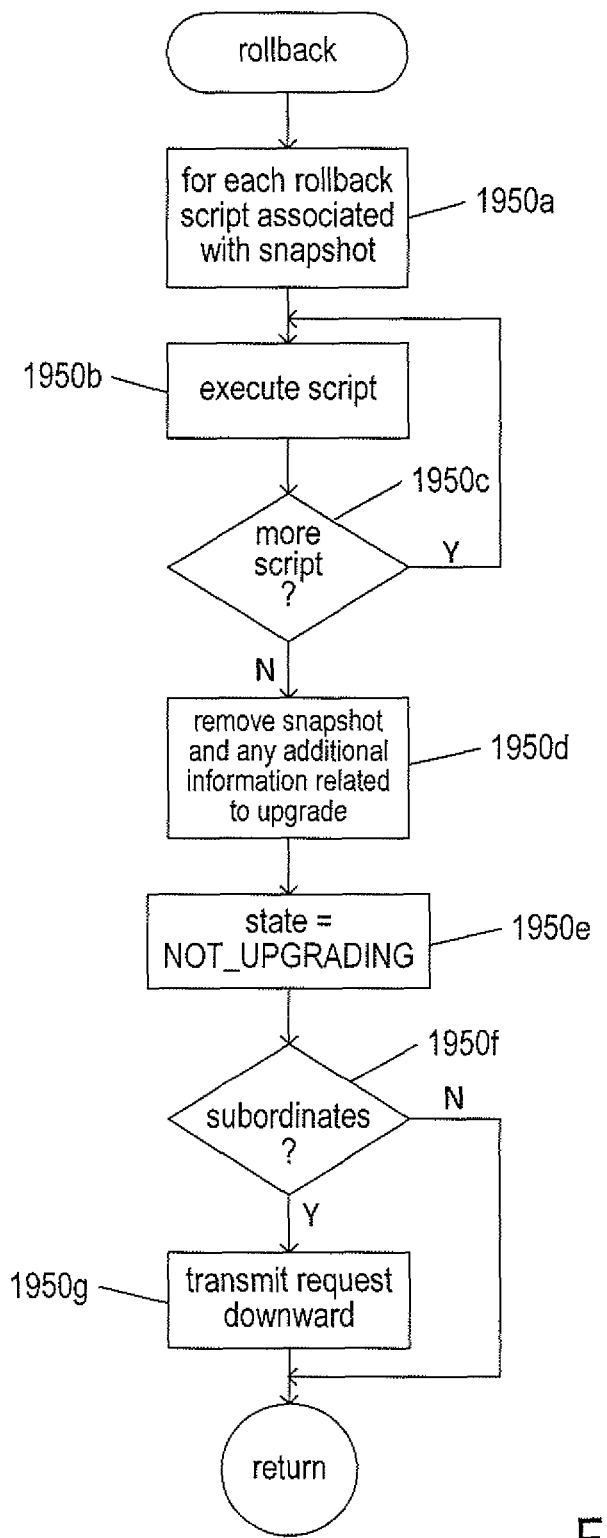

FIG. 19G provides a control-flow diagram for the routine "rollback," called in step 1910*j* of FIG. 19B and in step 1902*i* of FIG. 19A. In the for-loop of steps 1950*a*-1950*c*, any rollback scripts that are associated with the snapshot in the component are executed in order to carry out a rollback to the pre-upgrade state of the component. In step 1950*d*, the snapshot and any additional information related to the upgrade that has failed are removed from the component. In step 1950*e*, the upgrade state of the component is set to NOT_UPGRADING. When there are subordinate components, as determined in step 1950*f*, the rollback request is transmitted to the subordinate components in step 1950*g*.

FIG. 19H provides a table of calling-argument values for each of the four events: initiate upgrade; initiate snapshot; finish upgrade; and initiate verify. These events correspond to transitions 1806, 1818, 1820, and 1822 in the state-transition diagram illustrated in FIG. 18. These are the four main upgrade tasks carried out by an upgrade service within a component of a distributed service-based application.

The table shown in FIG. 19H indicates, in the top row, the meaning of each column. The first column provides an indication of the state transition or upgrade task for each row in the table 1960*a*. The second column 1960*b* lists the request-specific information supplied to the upgrade handler in order to carry out the task. The third, fourth, and fifth columns 1960*c*-*e* indicate the new state, target state, and current state for a component that carries out the state transition or task. The fifth and sixth columns 1960*f* and 1960*g* provide the Boolean values for the rollback indication and upgrade-failure indication, considered in step 1910*i* and 1910*l* in FIG. 19B. The final column 1960*h* provides an indication of the handler-specific function that is executed to carry out the task. The initiate-upgrade event, represented by row 1960*i*, compares the current version of the distributed service-based application executing within the component to the target component for the upgrade and also considers the computational resources available for the upgrade process to determine whether or not the upgrade can be carried out. The initiate-snapshot event, described by row 1960*j*, prepares and persistently stores a snapshot within the component. The finish-upgrade event, represented by row 1960*k*, persistently stores an indication that an upgrade is in progress, persistently stores the target-version executables and data files, and then restarts the target version of the component before terminating. It is this process that generates a new, upgraded version of the distributed service-based application component. Finally, the initiate-verify event, represented by row 1960*l*, calls a verification API to exhaustively test the functionality of the restarted target version. This may involve requesting that a different distributed service-based application component, such as a higher-level service process, make a series of service requests to the new target-version component and evaluate whether the responses are correct. The new target-version component may also carry out numerous self-test procedures.

Figure 20A:
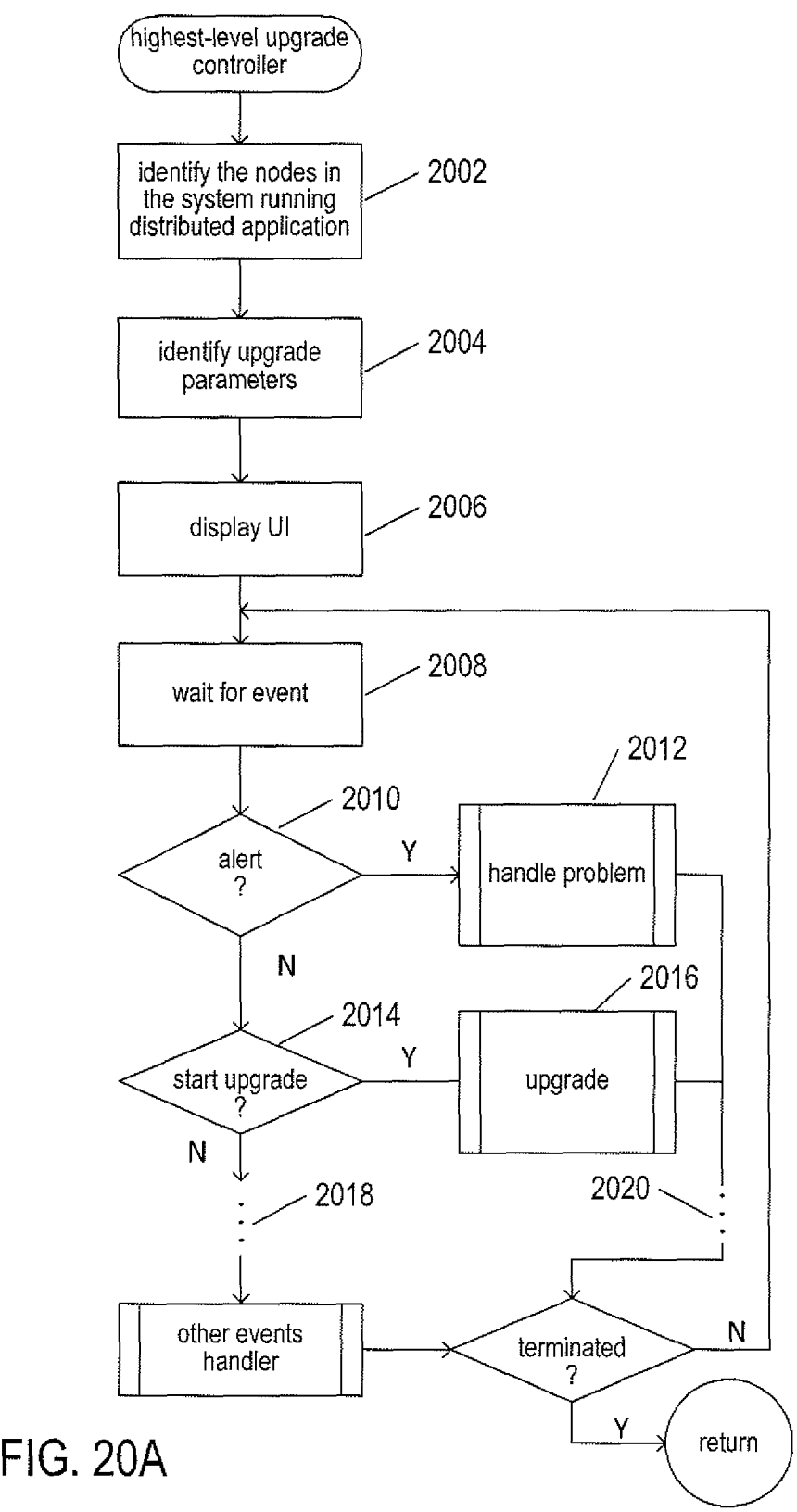
FIGS. 20A-B provide control-flow diagrams for the highest-level upgrade controller that displays the user interface and initiates the upgrade process on input to an upgrade input feature of the user interface.
Figure 20B:
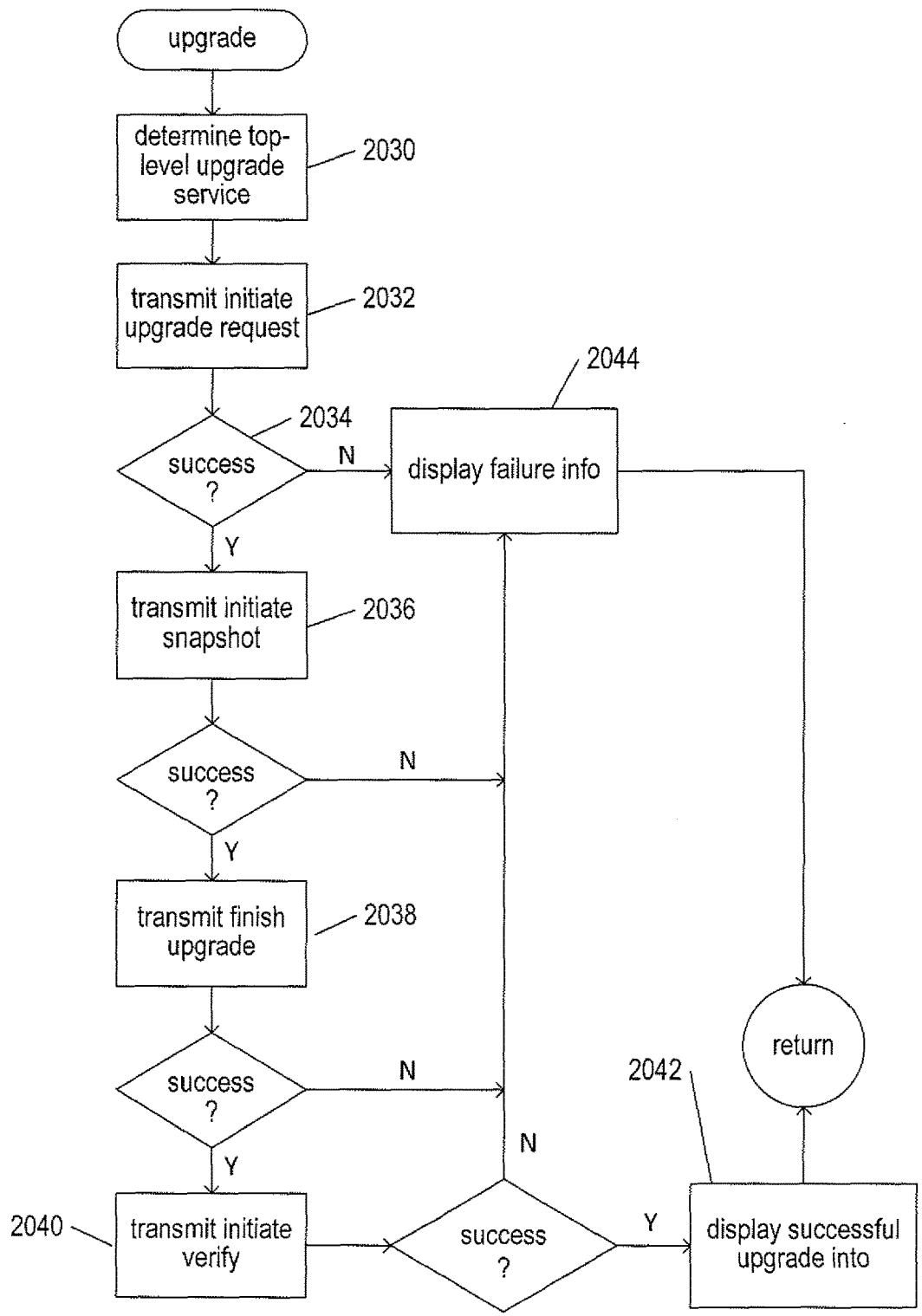

FIGS. 20A-B provide control-flow diagrams for the highest-level upgrade controller that displays the user interface and that initiates the upgrade process following user input to an upgrade input feature of the user interface. FIG. 20A provides a control-flow diagram for the highest-level upgrade controller. In step 2002, the controller identifies the nodes and components of the distributed service-based application. In step 2004, the controller identifies the upgrade parameters, such as the target version, upgrade packages, and other information needed for carrying out a distributed service-based application upgrade. In step 2006, the controller displays the UI to a system administrator or other user. In step 2008, the controller waits for a next event. When the event is an alert, as determined in step 2010, the controller attempts to handle the problem that spawned the alert either by automated processes or by notifying the system administrator through the UI to attempt manual intervention, in step 2012. When the next event represents user input to the upgrade feature of the UI, as determined in step 2014, the upgrade routine is called in step 2016. Ellipses 2018 and 2020 indicate that various other types of events may be handled by the controller. FIG. 20B provides a control-flow diagram for the routine "upgrade" called in step 2016. In step 2030, the controller determines the top-level upgrade service to which to direct an update request. In step 2032, the controller transmits the initiate-upgrade request to the top-level upgrade service. When success is returned, in step 2034, an initiate-snapshot request is issued to the top-level upgrade service in step 2036. When that request succeeds, a finish-upgrade request is transmitted to the top-level upgrade service, in step 2038. When that step succeeds, the controller issues an initiate-verify request to the top level controller in step 2040. When the verification succeeds, the controller displays successful-upgrade information to the user interface in step 2042. When any of the upgrade tasks fail, the controller displays failure user information to the user interface in step 2044.

During the upgrade process, the controller frequently receives return values and other information from the various upgrade services that are cooperating to complete the upgrade process. This allows the controller to continuously update information displayed on the user interface to allow system administrators to follow the upgrade process, when they so desire. A system administrator or other user may interact with the controller to suspend or terminate the upgrade process manually, and carry out other interventions, including solving problems that arise during the upgrade process.

Although the present invention has been described in terms of particular embodiments, it is not intended that the invention be limited to these embodiments. Modifications within the spirit of the invention will be apparent to those skilled in the art. For example, many different design and implementation parameters can be varied to produce alternative implementations, including choice of operating system, the hardware platforms and virtualization layers that are controlled by the distributed service-based application, modular organization, control structures, data structures, and other such parameters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A distributed computer system, comprising:
   a processor; and
   an automated upgrade subsystem within a distributed service-based application, multiple instances of which execute on multiple physical computer systems within the distributed computer system, the automated upgrade subsystem comprising:
      an upgrade controller that displays an upgrade interface on a display device and that launches an automated upgrade in response to user input to an input feature of the upgrade interface by transmitting an initiate-upgrade request, for upgrading at least a portion of the distributed service-based application, to a selected upgrade service; and
      upgrade services, within components of the distributed service-based application, that upgrade themselves to newer versions of upgrade services and request component upgrades from any subordinate upgrade services within lower-level components of the distributed service-based application, each upgrade service:
         determining whether or not an upgrade of a component is possible, in response to receiving the initiate-upgrade request,
         when the component upgrade is possible, preparing and storing a snapshot having information sufficient to restore the component to a pre-upgrade version,
         when a snapshot has been successfully prepared, persistently storing the component upgrade, upgrading the component, and restarting the upgraded component, and
         when the component is successfully restarted, verifying functionality of the upgraded component.

2. The automated upgrade subsystem of claim 1 wherein, after determining whether or not an upgrade is possible, when there are additional upgrade services subordinate to the upgrade service, the upgrade service transmits an initiate-upgrade request to the additional upgrade services to direct them to begin an upgrade.

3. The automated upgrade subsystem of claim 1 wherein, after preparing and storing a snapshot, when there are additional upgrade services subordinate to the upgrade service, the upgrade service transmits an initiate-upgrade request to the additional upgrade services to direct them to prepare and store a snapshot.

4. The automated upgrade subsystem of claim 1 wherein, after restarting the component, when there are additional upgrade services subordinate to the upgrade service, the upgrade service transmits a finish-upgrade request to additional upgrade services to direct them to persistently store a target version and restart the component.

5. The automated upgrade subsystem of claim 1 wherein, after verifying the functionality of the upgraded component, when there are additional upgrade services subordinate to the upgrade service, the upgrade service transmits a verify request to additional upgrade services to direct them to verify the target-version functionality that they previously stored and that is now executing following a restart.

6. The automated upgrade subsystem of claim 1 wherein an upgrade service receives an upgrade package from either a higher-level upgrade service or the upgrade controller, the upgrade package including:
   information that allows the upgrade service to store new executable and data files in a local computational environment, such as a physical server, in order to create a persistent instance of an upgraded entity; and
   one or more upgrade scripts and executables.

7. The automated upgrade subsystem of claim 1
   wherein the distributed service-based application executes within a virtual machine on one or more physical processors of a physical computer system; and
   wherein the distributed service-based application comprises
      one or more service processes that interact with remote computational entities through a service interface and a communications protocol selected from the REST protocol and the SOAP protocol, and
      one or more internal processes that communicate with the service processes through an interface and a communications protocol selected from the REST protocol, the SOAP protocol, and a local-network protocol.

8. The automated upgrade subsystem of claim 1 wherein upgrade of the distributed service-based application proceeds sequentially, component-by-component or component-group-by-component-group.

9. The automated upgrade subsystem of claim 8 wherein, during upgrade of the distributed service-based application, those components of the distributed service-based application that are not currently upgrading in response to receiving initiate-upgrade requests or that have completed upgrading following successful verification continue to function as they function when the distributed service-based application is not being upgraded.

10. The automated upgrade subsystem of claim 8 wherein the displayed upgrade interface displays the current versions of distributed service-based application components and available target versions to which the distributed service-based application can be upgraded.

11. The automated upgrade subsystem of claim 1 wherein, when an upgrade service fails to restart the component, the upgrade service carries out a rollback operation, using the stored snapshot, to return the component being upgraded by the upgrade service to a pre-upgrade state.

12. The automated upgrade subsystem of claim 11 wherein, after returning the component being upgraded by the upgrade service to a pre-upgrade state, the upgrade service transmits a rollback request to the additional upgrade services to direct them to carry out a rollback operation.

13. The automated upgrade subsystem of claim 1 wherein, when an upgrade service fails to verify the functionality of the upgraded component, the upgrade service carries out a rollback operation, using the stored snapshot, to return the component being upgraded by the upgrade service to a pre-upgrade state.

14. The automated upgrade subsystem of claim 13 wherein, after returning the component being upgraded by the upgrade service to a pre-upgrade state, the upgrade service transmits a rollback request to the additional upgrade services to direct them to carry out a rollback operation.

15. The automated upgrade subsystem of claim 1 wherein, during upgrade of the distributed service-based application, when a network failure or other problem arises within a component of the distributed service-based application, the upgrade service controlling upgrade of the component may raise an exception or alert, pausing upgrade of the distributed service-based application.

16. The automated upgrade subsystem of claim 15 wherein, in response to the raised exception or alert, a higher-level upgrade service or the upgrade controller attempts to automatically address the network failure or other problem and, when the network failure or other problem cannot be automatically addressed, an alert is displayed on the upgrade interface to initiate manual intervention.

17. The automated upgrade subsystem of claim 16 wherein, when the network failure or other problem is addressed, the upgrade service that raised the exception or alert resumes upgrading the component.

18. The automated upgrade subsystem of claim 16 wherein, when the network failure or other problem is addressed, the upgrade service that raised the exception or alert carries out a rollback operation.

* * * * *